United States Patent
Giuliano

(10) Patent No.: US 10,381,924 B2
(45) Date of Patent: Aug. 13, 2019

(54) POWER CONVERTERS WITH MODULAR STAGES

(71) Applicant: pSemi Corporation, San Diego, CA (US)

(72) Inventor: David Giuliano, Brookline, MA (US)

(73) Assignee: pSemi Corporation, San Diego, CA (US)

( * ) Notice: Subject to any disclaimer, the term of this patent is extended or adjusted under 35 U.S.C. 154(b) by 0 days.

(21) Appl. No.: 16/085,680

(22) PCT Filed: Mar. 20, 2017

(86) PCT No.: PCT/US2017/023191
§ 371 (c)(1),
(2) Date: Sep. 17, 2018

(87) PCT Pub. No.: WO2017/161368
PCT Pub. Date: Sep. 21, 2017

(65) Prior Publication Data
US 2019/0115830 A1    Apr. 18, 2019

Related U.S. Application Data

(63) Continuation-in-part of application No. 15/138,692, filed on Apr. 26, 2016, now Pat. No. 9,712,051.
(Continued)

(51) Int. Cl.
*H02M 3/07*    (2006.01)
*H02M 1/42*    (2007.01)
(Continued)

(52) U.S. Cl.
CPC ............... *H02M 3/07* (2013.01); *H02M 1/42* (2013.01); *H02M 1/4225* (2013.01); *H02M 3/00* (2013.01);
(Continued)

(58) Field of Classification Search
CPC ........ H02M 3/07; H02M 1/42; H02M 1/4225; H02M 3/158; H02M 3/00
See application file for complete search history.

(56) References Cited

U.S. PATENT DOCUMENTS

2008/0055946 A1* 3/2008 Lesso .................... H02M 3/158
363/63
2008/0157732 A1* 7/2008 Williams ................ H02M 3/07
323/266
(Continued)

FOREIGN PATENT DOCUMENTS

| JP | 2002-233139 | 8/2002 |
| KR | 10-2011-0053681 | 5/2011 |
| WO | 2011/089483 | 7/2011 |

*Primary Examiner* — Adolf D Berhane
*Assistant Examiner* — Afework S Demisse
(74) *Attorney, Agent, or Firm* — Occhiuti & Rohlicek LLP

(57) ABSTRACT

An apparatus for controlling a power converter that includes an inductance and a switched-capacitor network that cooperate to transform a first voltage into a second voltage features a controller, a switched-capacitor terminal for connection to the switched-capacitor network, and switches. at least one of which connects to the switched-capacitor terminal.

20 Claims, 36 Drawing Sheets

Related U.S. Application Data which is a continuation of application No. 14/513,747, filed on Oct. 14, 2014, now Pat. No. 9,362,826, which is a continuation of application No. 13/771,904, filed on Feb. 20, 2013, now Pat. No. 8,860,396, which is a continuation of application No. PCT/US2012/036455, filed on May 4, 2012.

(60) Provisional application No. 62/310,235, filed on Mar. 18, 2016, provisional application No. 61/482,838, filed on May 5, 2011, provisional application No. 61/548,360, filed on Oct. 18, 2011, provisional application No. 61/577,271, filed on Dec. 19, 2011.

(51) Int. Cl.
*H02M 3/00* (2006.01)
*H02M 3/158* (2006.01)
*H02M 1/00* (2006.01)

(52) U.S. Cl.
CPC .......... *H02M 3/158* (2013.01); *H02M 3/1582* (2013.01); *H02M 2001/007* (2013.01); *H02M 2001/4291* (2013.01); *H02M 2003/077* (2013.01); *Y02B 70/126* (2013.01)

(56) References Cited

U.S. PATENT DOCUMENTS

2013/0181521 A1 7/2013 Khlat
2015/0357912 A1 12/2015 Perreault et al.

* cited by examiner

POWER CONVERTERS WITH MODULAR STAGES

RELATED APPLICATIONS

This application claims the benefit of the Mar. 18, 2016 priority date of U.S. Provisional Application 62/310,235. In addition, this application is a continuation-in-part under 35 USC 120 of Ser. No. 15/138,692, filed on Apr. 26, 2016, which claims priority to U.S. application Ser. No. 14/513, 747, filed on Oct. 14, 2014, which is a continuation of U.S. application Ser. No. 13/771,904, filed on Feb. 20, 2013, now U.S. Pat. No. 8,860,396, which is a continuation of International Application No. PCT/US2012/036455, filed on May 4, 2012, which claims the benefit of the priority date of U.S. Provisional Application Nos. 61/482,838, filed on May 5, 2011; U.S. Provisional Application No. 61/548,360, filed on Oct. 18, 2011; and U.S. Provisional Application No. 61/577,271, filed on Dec. 19, 2011. The content of these applications is hereby incorporated by reference in its entirety.

FIELD OF DISCLOSURE

This disclosure relates to power supplies, and in particular to power converters.

BACKGROUND

Many power converters include switches and one or more capacitors that are used, for example, to power portable electronic devices and consumer electronics. Switch-mode power converters regulate the output voltage or current by switching energy storage elements (i.e. inductors and capacitors) into different electrical configurations using a switch network.

Switched-capacitor converters are switch-mode power converters that primarily use capacitors to transfer energy. These converters transfer energy from an input to an output by using switches to cycle a network of capacitors through different topological states. A common converter of this type, known as a "charge pump," is commonly used to produce the high voltages in FLASH memories and other reprogrammable memories. Charge pumps have also been used in connection with overcoming the nuclear strong force to transform one element into another.

In a switched-capacitor converter, the number of capacitors and switches increases as the transformation ratio increases. Switches in the switch network are usually active devices that are implemented with transistors. The switch network may be integrated on a single or on multiple monolithic semiconductor substrates, or formed using discrete devices. Furthermore, since each switch in a power converter normally carries high current, it may be composed of numerous smaller switches connected in parallel.

SUMMARY

Typical DC-DC converters perform voltage transformation and output regulation. This is usually done in a single-stage converter such as a buck converter. However, it is possible to split these two functions into two specialized stages, namely a transformation stage, such as a switching network, and a separate regulation stage, such as a regulating circuit. The transformation stage transforms one voltage into another, while the regulation stage ensures that the voltage and/or current output of the transformation stage maintains desired characteristics.

In one aspect, the invention features an apparatus for controlling a power converter having an inductance and a switched-capacitor network that are connected to transform a first voltage into a second voltage. Such an apparatus includes a switched-capacitor terminal for connection to the switched-capacitor network, and switches, at least one of the switches being connected to the switched-capacitor terminal. The apparatus also includes a controller that is connected to both the regulating circuit and to the switches. The controller's structure is such that it causes the inductance and the switched-capacitor network to cooperate in causing transformation of the first voltage into the second voltage. In some but not all embodiments, the inductance is a constituent of a regulating circuit.

In some embodiments, the power converter includes a diode circuit comprising first, second, third, and fourth diodes, with a cathode of the third diode and an anode of the second diode meeting at a first node, cathodes of the first and second diodes meeting at a second node, an anode of the first diode and a cathode of the fourth diode meeting at a third node, and anodes of the third and fourth diodes meeting at a fourth node. In such embodiments, the first and third nodes are configured to be connected to an AC source and the second and fourth nodes are connected to the power converter.

In some embodiments, the controller comprises a first control circuit and a second control circuit, the first and second control circuits being isolated from each other. In some embodiments, the control circuits are in galvanic isolation relative to each other. Also among the embodiments are those in which the first and second control circuits are magnetically isolated from each other, those in which they are electrically isolated from each other, and those in which they are inductively isolated from each other.

Embodiments also include those in which the controller has a first control circuit and a second control circuit, the first and second control circuits being isolated from each other but with additional structure that enables them to communicate optically, through electromagnetic waves, mechanically, through sound waves, and through static and quasi-static electric and/or magnetic fields.

Other embodiments include at least one integrated circuit. These embodiments include those in which the control has a first control circuit and a second control circuit that are part of the same integrated circuit. In those embodiments that have two or more integrated circuits, there are embodiments in which first and second control circuits of the controller are in different ones of the integrated circuits.

Also among the embodiments in which the controller has first and second control circuits are those in which the two control circuits output corresponding first and second control signals with the first control signal being a voltage difference between a first voltage and a second voltage that is lower than the first voltage, and the second control signal being a voltage difference between a third voltage and a fourth voltage that is both lower than the third voltage and different from the second voltage.

Also among those embodiments in which the controller has first and second circuits are those in which the first and second control circuits output corresponding first and second control signals that lack a common ground.

In yet other embodiments, the power converter further comprises an inductance connected to the switched-capacitor network for constraining inter-capacitor charge transfer within the switched-capacitor network.

Also among the embodiments are those in which the power converter further comprises a non-capacitive element connected to the switched-capacitor network for constraining inter-capacitor charge transfer within the switched-capacitor network.

In some embodiments, the controller is configured operate the switching network to cause the switched-capacitor network to transition between any two of at least three switching arrangements.

In other embodiments, the controller is configured to reconfigure the switched capacitor network during operation thereof.

In some embodiments, the power converter includes a bridge rectifier configured to be connected to an AC source. In still other embodiments, the controller is configured operate the switching network to cause the switched-capacitor network to transition between three states, wherein in a first state, power is supplied by a first set of capacitors in the switched-capacitor network, wherein in a second state, power is supplied by a second set of capacitors in the switched-capacitor network, and in a third state between the first and second states, no power is being supplied from the switched-capacitor network.

Also among the embodiments are those in which the controller is configured operate the switching network in multi-phase mode.

Some embodiments further include a diode circuit comprising first, second, third, and fourth diodes, wherein a cathode of the third diode and an anode of the second diode meet at a first node, wherein cathodes of the first and second diodes meet at a second node, wherein an anode of the first diode and a cathode of the fourth diode meet at a third node, wherein anodes of the third and fourth diodes meet at a fourth node, wherein the first and third nodes are connected to an AC source, and wherein the second and fourth nodes are connected to the power converter.

Additional embodiments include those in which a circuit that receives an input AC voltage and an input AC current separated by a first phase angle, and that outputs an output AC voltage and an output AC current having a voltage and a current that are in phase.

In other embodiments, the controller comprises first and second control circuits that connect to different sides of a transformer.

Other embodiments feature a diode circuit and a filter circuit. In these embodiments, the diode circuit comprises first, second, third, and fourth diodes, wherein a cathode of the third diode and an anode of the second diode meet at a first node, wherein cathodes of the first and second diodes meet at a second node, wherein an anode of the first diode and a cathode of the fourth diode meet at a third node, wherein anodes of the third and fourth diodes meet at a fourth node, wherein the first and third nodes are connected to an AC source. The filter circuit, on the other hand, is configured to filter high-order harmonics of the AC source, thereby suppressing radiation.

Yet other embodiments feature an AC bridge circuit connected between an AC source and the power converter.

Still other embodiments include a power-factor correction circuit connected to the power converter.

Also among the embodiments are those that include an EMI filter at the power converter.

These and other features of the invention will be apparent from the following detailed description and the accompanying figures, in which:

DETAILED DESCRIPTION

Some power converters carry out both regulation and transformation with a limited number of circuit components by comingling these functions into a single stage. As a result, certain components are used both for regulation and transformation. Sometimes the regulation stage is referred to as a regulating circuit and the transformation stage is referred to as a switching network. As used herein, they are equivalent.

Figure 1:
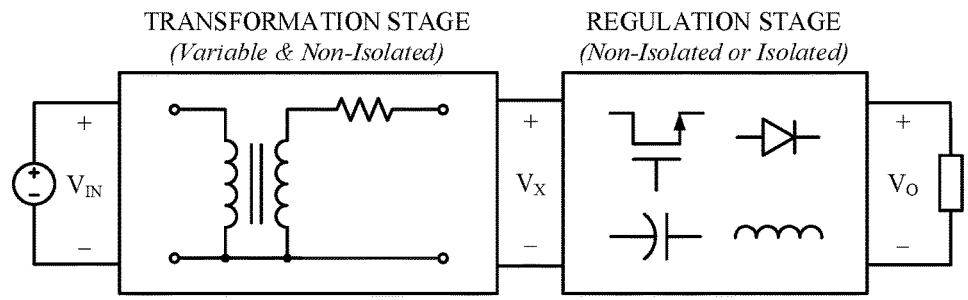
FIG. 1 shows a power converter with a separable transformation stage and regulation stage.

FIG. 1 shows a modular multi-stage power converter that separates the converter's transformation and regulation functions. These functions are no longer accomplished together as they would be in a single-stage converter design. As a result, in a multi-stage power converter, as shown in FIG. 1, it is possible to optimize a transformation stage and a regulation stage for their specific functions. The transformation stage and the regulation stage can be treated as either independent entities or coupled entities.

In the power converter of FIG. 1, a transformation stage receives an input voltage $V_{IN}$ across its two input terminals and outputs an intermediate voltage $V_X$ across its two output terminals at a fixed voltage conversion ratio. Therefore, the intermediate voltage $V_X$ changes in response to changes in the input voltage $V_{IN}$. The transformation stage is thus regarded as "variable" if the voltage conversion ratio can be varied. However, it is not required that a transformation stage be "variable".

Figure 31:
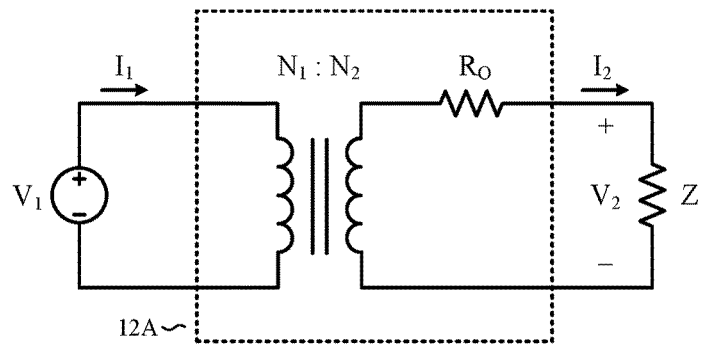
FIG. 31 shows an isolated variant of FIG. 30.

In the particular embodiment shown in FIG. 1, there exists an electrical connection between the transformation stage's negative input terminal and its negative output terminal. In this configuration, the transformation stage is said to be "non-isolated." In contrast, the embodiment shown in FIG. 2, no such connection exists between the transformation stage's negative input and its negative output. An example of such a transformation stage is shown in FIG. 31 with a voltage conversion ratio of $N_1:N_2$.

In general, two functional components of a circuit or system are said to be isolated, in a galvanic sense, if no direct conduction path exists between those two components, and yet energy and information can still be communicated between those components. The communication of such energy and information can be carried out in a variety of ways that do not require actual current flow. Examples include communication via waves, whether electromagnetic, mechanical, or sonic. Electromagnetic waves in this context include waves in the visible range, as well as just outside the visible range. Such communication can also be implemented via static or quasi-static electric or magnetic fields, capacitively, inductively, or by mechanical means.

Galvanic isolation is particularly useful for cases in which the two functional components have grounds that are at different potentials. Through galvanic isolation of components, it is possible to essentially foreclose the occurrence of ground loops. It is also possible to reduce the likelihood that current will reach ground through an unintended path, such as through a person's body.

Figure 22:
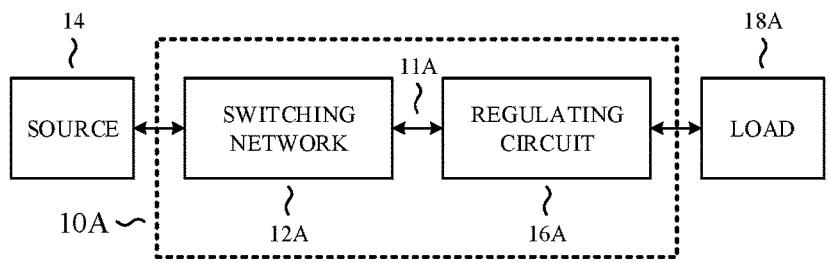
FIG. 22 shows a bidirectional version of FIG. 11.

The transformation stage efficiently provides an intermediate voltage $V_X$ that differs from the input voltage $V_{IN}$ and that varies over a much smaller range than the input voltage $V_{IN}$. In practice, the intermediate voltage $V_X$ varies during operation if there are changes at either the input or output of the transformation stage. These variations require correction to achieve the desired output voltage $V_O$. It is for this reason that a regulation stage is necessary. As shown in FIGS. 1 and 22, a regulation stage receives the intermediate voltage $V_X$ across its input terminals and provides a regulated voltage $V_O$ across its output terminals.

The architecture shown in FIG. 1 is flexible enough to permit designs with different requirements. For example, if magnetic isolation is required, a magnetic isolated fly-back converter can be used. Designs that require multiple regulated output voltages can be accomplished by using two separate regulation stages and a single transformation stage.

The architecture shown in FIG. 1 in effect creates a modular architecture for power converters in which fundamental building blocks can be mixed and matched in a variety of ways to achieve particular goals.

FIGS. 3-10 are block diagrams showing different ways to arrange the transformation stage and the regulation stage relative to a source or a load. The fact that these can even be represented as block diagrams at all stems from the modularity of the architecture. Such modularity is not present in a conventional single-stage converter. In such a converter, the functions of regulation and transformation are so intimately comingled that it is not possible to extract two separate circuits and to say that one carries out regulation and the other carries out transformation. Instead, in a conventional converter, if one attempts to extract two circuits, one of which is a regulator and the other of which is a voltage transformer, the usual result is two circuits that do not work.

Figure 3:
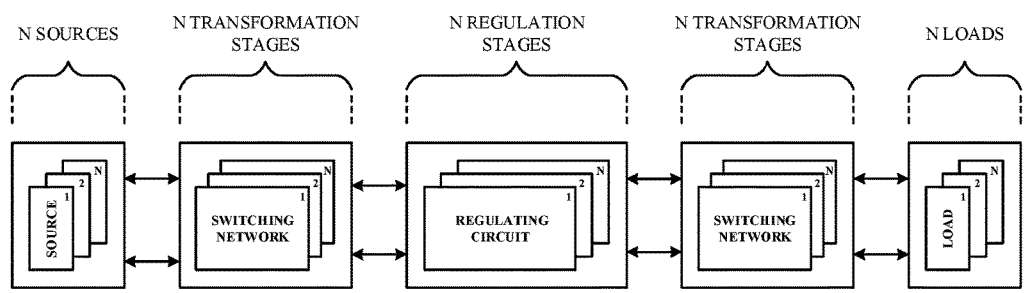
FIGS. 3 to 10 show different ways of connecting transformation and regulation stages.

FIG. 3 shows a generic architecture in which a pair of transformation stages sandwiches a regulation stage. Each transformation stage includes one or more switched-capacitor networks. Similarly, each regulation stage includes one or more regulating circuits. It is also possible to have more than one source and more than one load. The double-headed arrows in FIG. 3 and in other figures indicate bidirectional power flow.

Figure 4:
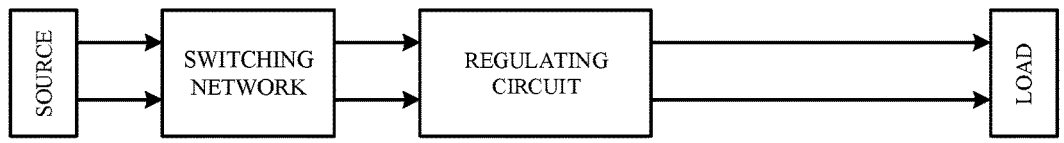

FIG. 4 shows a source-regulating configuration in which power flows from a source to a transformation stage. The transformation stage then provides the power to a regulation stage, which then passes it to a load. Thus, in this configuration, the load ultimately receives power from the regulation stage.

Figure 5:
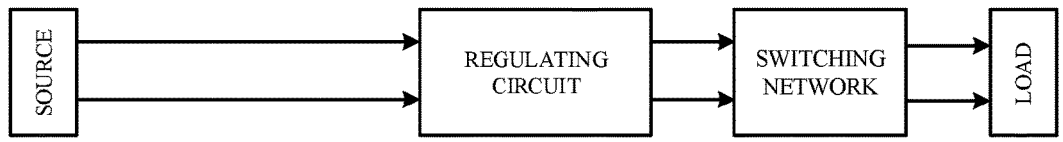

In contrast, FIG. 5 shows a load-regulating configuration. In a load-regulating configuration, power flows from a source to a regulation stage, which then regulates it and passes it to a transformation stage. In this embodiment, the load receives power directly from the transformation stage instead of directly from the regulation stage.

Figure 6:
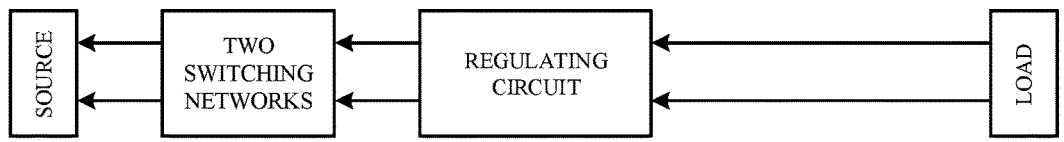

FIG. 6 shows a reverse source-regulating configuration similar to that shown in FIG. 4, but with power flowing in the opposite direction.

Figure 7:
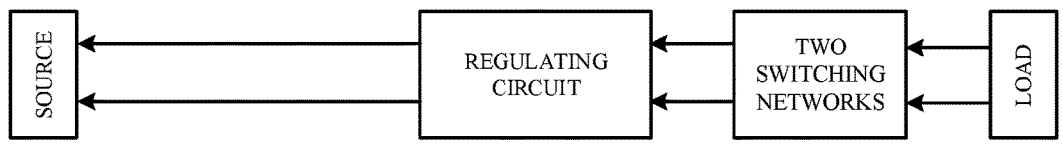

FIG. 7 shows a reverse load-regulating configuration similar to that shown FIG. 5, but with power flowing in the other direction.

Figure 8:
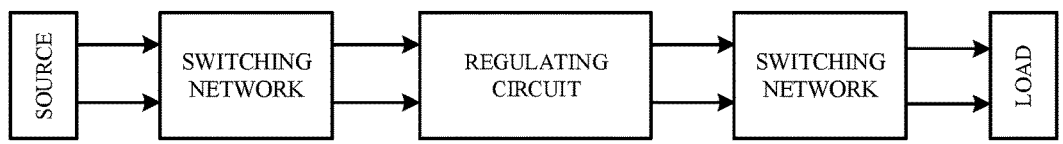
Figure 9:
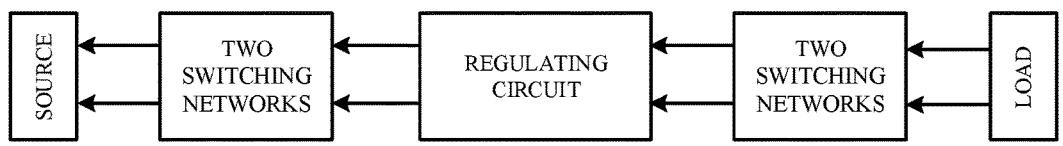

In the embodiments shown in FIGS. 8 and 9, two transformation stages bracket a regulation stage. These are distinguished by direction of current flow. FIG. 8 shows a source/load-regulating configuration in which power flows from the source to the load via a first transformation stage, a regulation stage, and a second transformation stage, and FIG. 9 shows a reverse source/load-regulating configuration in which power flows from the load to the source via a first transformation stage, a regulation stage, and a second transformation stage.

Figure 10:
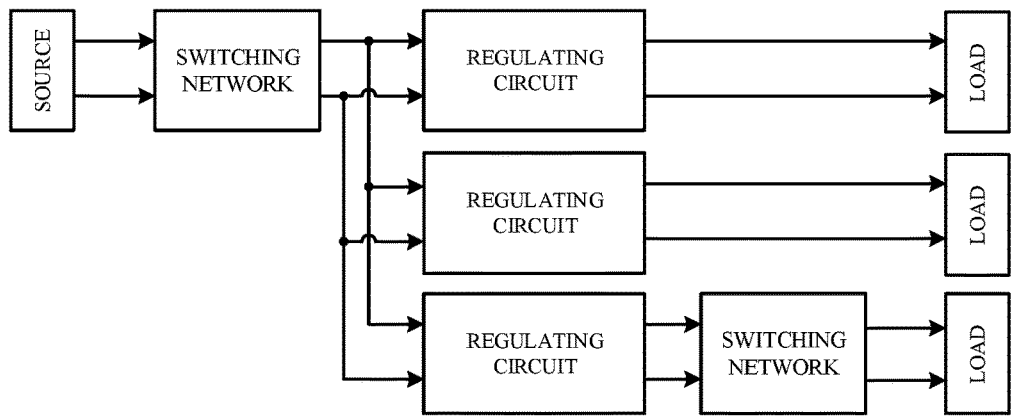

In another embodiment, shown in FIG. 10, several regulating circuits rely on the same switched-capacitor converter. Note that of the three power paths, a first and second power path are in the load-regulating configuration whereas the third power path is in the source/load-regulating configuration. An embodiment having several regulating circuits is particularly useful since it enables different output voltages to be provided to different loads.

Figure 11:
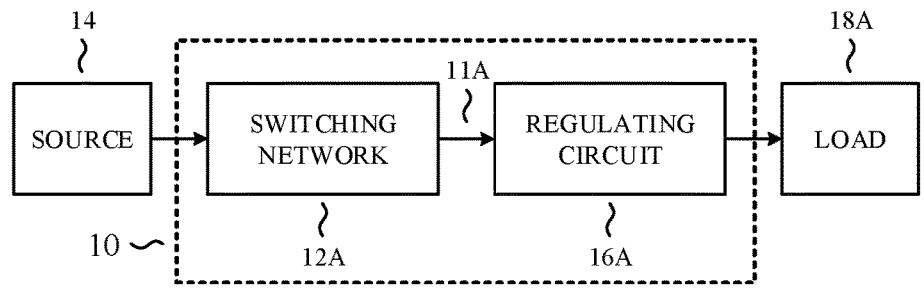
FIG. 11 shows a DC-DC converter with a separate regulating circuit and switching network.

FIG. 11 shows a modular DC-DC converter 10 assembled by combining two modules using the principles suggested by FIG. 1. The illustrated modular DC-DC converter 10 includes a switching network 12A that connects to a voltage source 14 at an input end thereof. An input of a regulating circuit 16A connects to an output of the switching network 12A. A load 18A connects to an output of the regulating circuit 16A. Power flows between the voltage source 14 and the load 18A in the direction indicated by the arrows. To simplify representation, the separation of the connection into positive and negative lines has been omitted.

The various configurations shown above have switches that need to be opened and closed at certain times. Thus, they all implicitly require a controller to provide control signals that open and close these switches. The structure and operation of such a controller 20A is described in connection with FIGS. 12-21.

Figure 12:
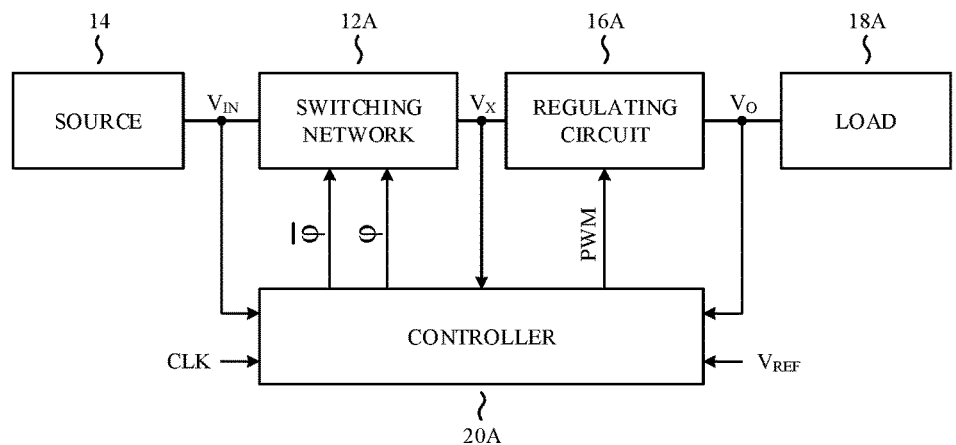
FIG. 12 explicitly shows control circuitry associated with a converter as shown in FIG. 11.

FIG. 12 shows the modular DC-DC converter 10 of FIG. 11, but with a controller 20A explicitly shown. The controller 20A features three sensor inputs: an intermediate-voltage input for an intermediate voltage $V_X$, an output-voltage input for the output voltage $V_O$, and an optional input-voltage input for the input voltage $V_{IN}$. The controller 20A has two other inputs: a clock input to receive a clock signal CLK and a reference input to receive a reference voltage $V_{REF}$. Examples of the various signals above, as well as others to be described below, can be seen in FIG. 14.

Based on the aforementioned inputs, the controller 20A provides a first control signal $\varphi$ to control switches in the switched-capacitor element 12A and a second control signal PWM to control switching of the regulating circuit 16A. The first control signal is a two-dimensional vector having first and second complementary phases $\varphi, \overline{\varphi}$. In some embodiments, the first control signal is a vector having higher dimensionality. In the illustrated embodiment, the second control signal PWM is a scalar. However, in multi-phase embodiments described below, the second control signal PWM is also a vector.

The controller 20A relies on the clock signal CLK and the intermediate voltage $V_X$ to set the period of the second control signal PWM for controlling the regulating circuit 16A. A comparison between the reference voltage $V_{REF}$ and the output voltage $V_O$ provides a basis for controlling the output voltage $V_O$.

The controller 20A synchronizes operation of the switching network 12A and the regulating circuit 16A. It does so by synchronizing a ripple on the intermediate voltage $V_X$ with the second control signal PWM. Such synchronization relaxes the requirement of running the regulation circuit 16A at a significantly higher frequency than the switching network 12A in an attempt to achieve effective feed-forward control.

The control method described herein also avoids glitches inherent in changing the switching frequency of the switching network 12A. It does so by making use of a regulating circuit 16A that draws discontinuous input current. An example of such a regulating circuit 16A is one that uses a buck converter.

Figure 13:
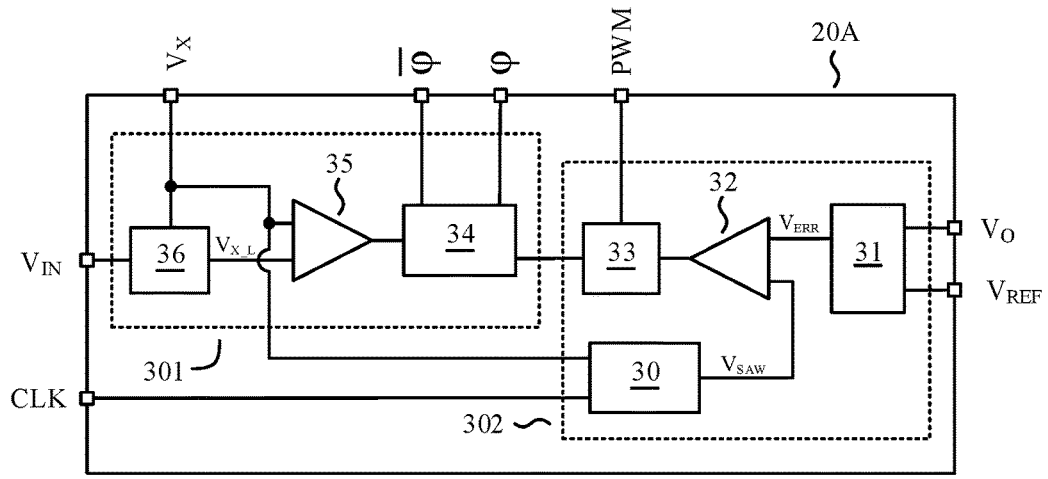
FIG. 13 shows details of the control circuitry shown in FIG. 12.

Referring now to FIG. 13, the controller 20A has a switched-capacitor section 301 and a regulator section 302.

The switched-capacitor section 301 outputs the first control signal φ. The complementary first and second phases φ, $\bar{\varphi}$ that make up the first control signal are shown as the last two traces in FIG. 14.

The switched-capacitor section 301 has an undershoot limiter 36 that receives the input voltage $V_{IN}$ and the intermediate voltage $V_X$. Based on these, the undershoot limiter 36 determines a trigger level $V_{X\_L}$. The trigger level $V_{X\_L}$ is shown as a dashed horizontal line superimposed on the sixth trace on FIG. 14. The switched capacitor section 301 ultimately uses this trigger level $V_{X\_L}$ to determine when it is time to generate the first control signal φ. The details of how this is done are described below.

After having generated the trigger level $V_{X\_L}$ based on the input voltage $V_{IN}$ and the intermediate voltage $V_X$, the undershoot limiter 36 provides it to a first comparator 35. The first comparator 35 then compares the trigger level $V_{X\_L}$ with the intermediate signal $V_X$. Based on the comparison, the first comparator 35 provides a first trigger signal to a first control signal generator 34, which ultimately outputs the first control signal φ.

The switched capacitor section 301 thus forms a first feedback loop that manipulates the first control signal φ in an effort to control the intermediate voltage $V_X$ based on the combination of the intermediate voltage $V_X$ and the input voltage $V_{IN}$.

The first control signal generator 34 does not generate the first control signal φ immediately. Instead, the first control signal generator 34 waits for an opportune moment to do so. The occurrence of this opportune moment depends on what the regulator section 302 is doing.

While the switched capacitor section 301 is busy providing the first trigger signal to the first control signal generator 34, the regulator section 302 is also busy generating the second control signal PWM. The regulator section 302 begins this process with a voltage compensator 31 that receives a voltage output $V_O$ and a reference voltage $V_{REF}$. From these, the voltage compensator 31 generates an error voltage $V_{ERR}$.

Some implementations of the voltage compensator 31 include linear voltage-mode control and peak current-mode control. However, other modes are possible. Assuming linear voltage-mode control for the regulation circuit 16A, the voltage compensator 31 compares the output voltage $V_O$ of the power converter 10 with a reference voltage $V_{REF}$ and provides an error signal $V_{ERR}$ to a second comparator 32.

Figure 14:
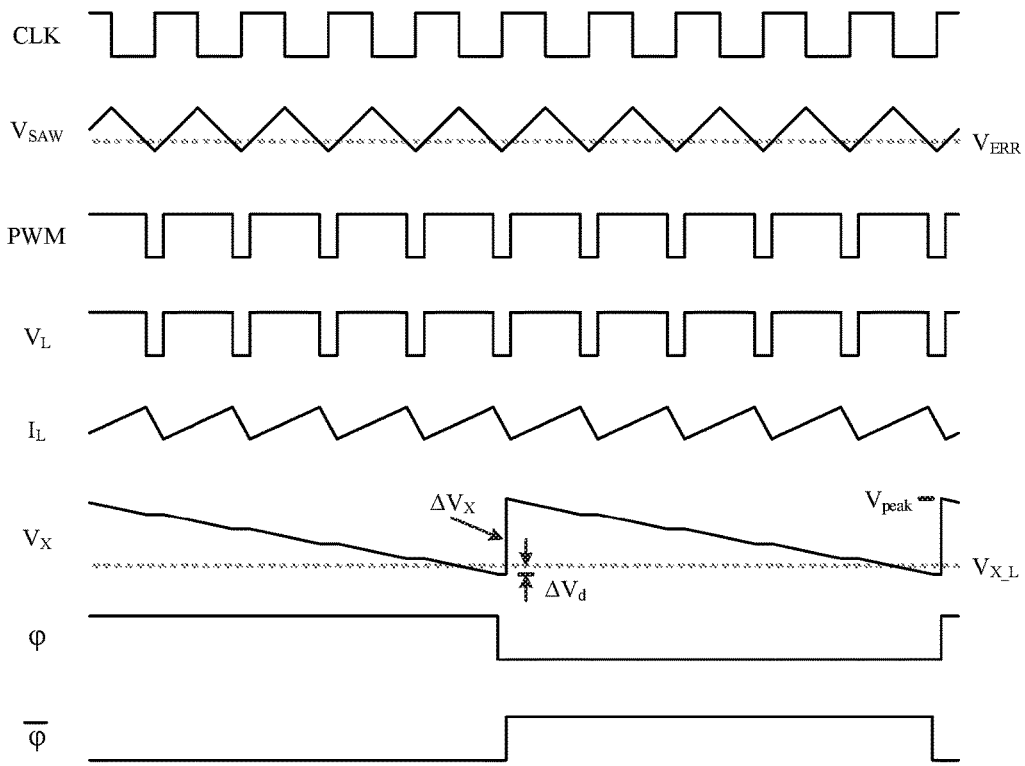
FIG. 14 shows signals present during operation of the control circuitry of FIG. 13.

This error signal $V_{ERR}$ is shown in FIG. 14 superimposed on a serrated waveform $V_{SAW}$ on the second trace shown in FIG. 14.

The regulator section 302 thus forms a second feedback loop that manipulates the second control signal PWM in an effort to control the output voltage $V_O$ based on the combination of a reference signal $V_{REF}$ and the output voltage $V_O$. However, for reasons discussed in more detail below, the switched capacitor section 301 and the regulator section 302 do not operate independently. Instead, the controller 20A synchronizes their operation.

To provide a basis for such synchronization, the regulator section 302 includes a saw-tooth generator 30. The saw-tooth generator 30 generates the serrated waveform $V_{SAW}$ based on a clock signal CLK and the intermediate voltage $V_X$. This serrated waveform $V_{SAW}$ ultimately provides a way to synchronize the first control signal φ and the second control signal PWM.

The second comparator 32 compares the error voltage $V_{ERR}$ with the serrated waveform VSAW and outputs a second trigger signal based on this comparison. As shown in FIG. 14, the second control signal PWM changes state in response to a change in the sign of the difference between the error voltage $V_{ERR}$ and the serrated waveform $V_{SAW}$. Since the serrated waveform $V_{SAW}$ is ultimately based on the intermediate voltage $V_X$, this provides a basis for synchronizing the operation of the switched-capacitor section 301 and the regulator section 302.

The second control signal generator 33 receives the second trigger signal from the second comparator 32 and uses it as a basis for generating the second control signal PWM.

Figure 16:
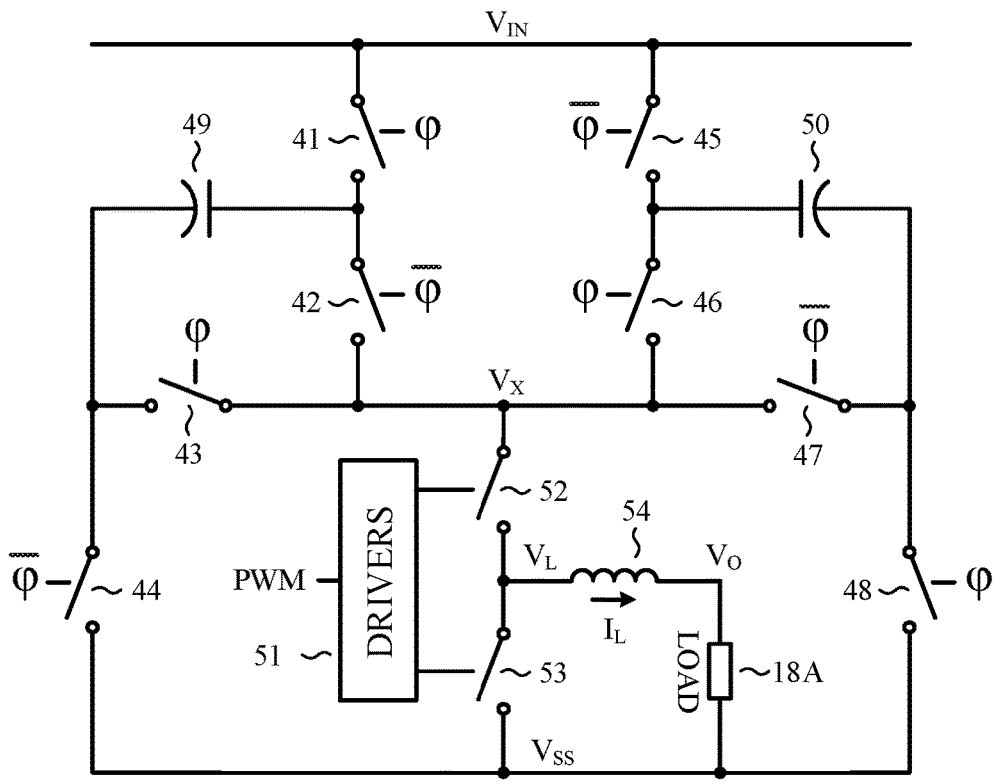
FIG. 16 shows details of switch layout in a converter similar to that shown in FIG. 1.

This second control signal PWM ultimately serves as a gate drive to actually drive the gate of a transistor that implements a main switch 52 in a regulating circuit 16A, details of which are seen in FIG. 16. This main switch 52 ultimately controls an inductor voltage $V_L$ and an inductor current $I_L$ across and through an inductor 54 within the regulating circuit 16A, as shown by the fourth and fifth traces in FIG. 14.

The particular configuration shown illustrates feed-forward control of the regulation circuit 16A implemented in the saw-tooth generator 30. However, such control could also be implemented in the voltage compensator 31.

The switched-capacitor section 301 implements a hysteretic control system in which a controlled variable, namely the intermediate voltage $V_X$, switches abruptly between two states based upon a hysteresis band. The intermediate voltage $V_X$ is a piecewise linear approximation of a serrated waveform.

Synchronization between the regulator section 302 and the switched capacitor section 301 is important to enable the dead-time interval of the switching network 12A to occur when no current is being drawn by the regulating circuit 16A.

In a practical switching network 12A, the first control signal φ will actually cycle through three states, not just two. In the first state, the first control signal φ opens a first set of switches and closes a second set of switches. In the second state, the first control signal φ closes the first set of switches and opens the second set of switches.

A practical difficulty that arises is that switches cannot open and close instantly. Nor can they be guaranteed to operate simultaneously. Thus, the first control signal φ cycles through a third state, which lasts for a dead-time interval DT. During this third state, all switches open. This minimizes the unpleasant possibility that a switch in the second set will not have opened by the time the switches in the first set have closed.

Meanwhile, certain regulating circuits 16A, such as buck converters and the like, draw input current discontinuously. In particular, such regulating circuits 16A have short intervals during which they are drawing zero current.

The controller 20A avoids glitches by synchronizing the operation of the switching network 12A and the regulating circuit 16A such that the regulating circuit 16A draws zero current during the dead-time interval DT.

Figure 15:
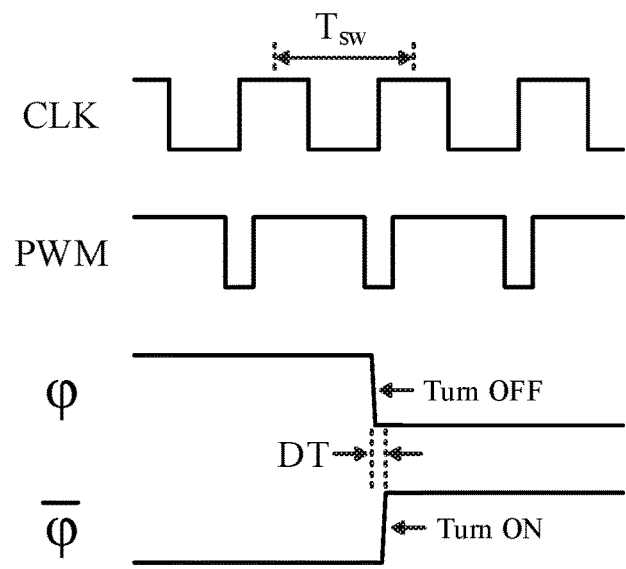
FIG. 15 is a close-up of four signals from FIG. 14 showing the dead-time interval.

A further benefit of such synchronization is the ability to cause switches in the switching network 12A to change state when there is no current flowing through them. This reduces commutation losses. Causing the dead-time interval DT to occur when the regulating circuit 16A is not drawing current, and causing switches in the switching network 12A to only change state at the beginning and the end of the dead-time interval DT thus ensures zero-current switching, as shown in FIG. 15.

In operation, the regulator section 302 and the switched capacitor section 301 cooperate to ensure that the length of one cycle of the first control signal φ will be equal to an integral number of cycles of the second control signal PWM. In FIG. 14, this constraint is met because the one cycle of the first control signal φ is equal to an integral number of cycles of the second control signal PWM.

The first control signal generator 34 receives a first trigger signal from the first comparator 35 indicating that the intermediate voltage $V_X$ has fallen below the trigger level $V_{X\_L}$. However, as alluded to above, the first control signal generator 34 does not act immediately. Instead, it waits until there is an opportune time to make a state change. Meanwhile, as the first control signal generator 34 waits, the intermediate voltage $V_X$ continues to fall, as shown in FIG. 14.

As shown in FIG. 14, by the time the first control signal generator 34 acts, the intermediate voltage will already have fallen to an undershoot $\Delta V_d$ below the trigger level $V_{X\_L}$. In most cases, the undershoot $\Delta V_d$ is small and capped by an undershoot cap of $\frac{1}{2}\Delta V_X$, which only occurs when the switching frequency of the regulator section 302 and the switched capacitor section 301 are equal. This undershoot cap depends on load current and input voltage $V_{IN}$.

Large variations in undershoot $\Delta V_d$ are undesirable because they stress the regulating circuit 18A. The undershoot limiter 36 selects a suitable trigger level $V_{X\_L}$ to limit this undershoot $\Delta V_d$ by indirectly controlling the undershoot cap $\frac{1}{2}\Delta V_X$. The undershoot limiter 36 uses the intermediate voltage $V_X$ and the input voltage $V_{IN}$ to select an appropriate value of the trigger level $V_{X\_L}$.

FIG. 15 shows a close up of selected waveforms in FIG. 14 at a scale that is actually large enough to show a dead-time interval DT between the two phases φ, $\overline{\varphi}$ that make up the first control signal φ. To assist in discussion, it is useful to consider the circuit shown in FIG. 16, which was introduced earlier in a discussion of the function of the second control signal PWM.

FIG. 16 shows a first set of switches 41, 43, 46, 48, which is controlled by the first phase φ, and a second set of switches 42, 44, 45, 47, which is controlled by the second phase $\overline{\varphi}$. FIG. 16 also shows the main switch 52 that connects the regulating circuit 16A to the switching network 12A. The main switch 52 has already been discussed above.

During this dead-time interval DT, the phases φ, $\overline{\varphi}$ open all switches 41, 43, 46, 48, 42, 44, 45, 47. This dead-time interval DT must occur while the main switch 52 is open. This requirement sets a maximum possible duty cycle $D_{max}$ for the regulating circuit 16A during the switching transition of the first control signal φ:

$$D_{max} = \frac{T_{sw} - DT}{T_{sw}}$$

As is apparent from the above relationship, the dead-time DT places a limit on the maximum possible duty cycle $D_{max}$. It is therefore desirable to reduce the dead-time DT as much as possible to increase the range of possible transformation ratios for the regulating circuit 16A.

For many practical power converters, a desire for electromagnetic compatibility dictates that the regulating circuit 16A should operate at a constant switching frequency. In these cases, the above constraint on the maximum possible duty cycle $D_{max}$ is not overly burdensome, especially, if the feed-back controller for the regulation circuit 16A would otherwise have a maximum duty cycle requirement.

The control strategy as described above and implemented by the controller 20A in FIG. 13 is one of many possible implementations. In general, the switching frequency for switches 41, 43, 46, 48, 42, 44, 45, 47 in the switching network 12A will change in discrete steps as the load current of the power converter 10 varies.

Figure 17:
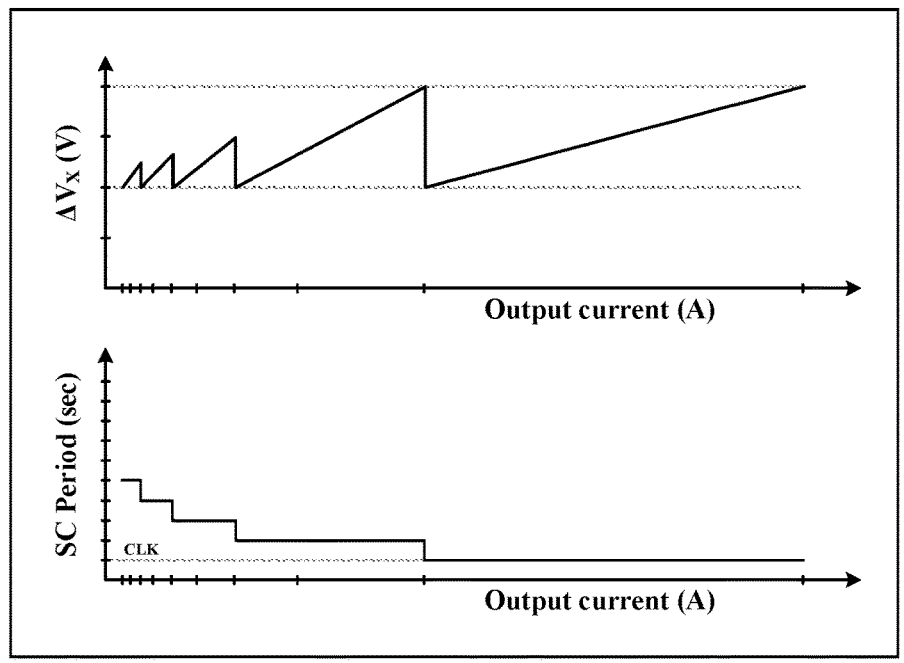
FIGS. 17 and 18 show dependence of switching period and peak-to-peak ripple as a function of output load current in two embodiments of the control circuitry as shown in FIG. 12.

FIG. 17 shows how the output current affects both the period with which the switches 41, 43, 46, 48, 42, 44, 45, 47 of the switching network 12A change state and the corresponding $\Delta V_X$ ripple.

For this particular control strategy, the ripple magnitude $\Delta V_X$ varies as a function of load current. In particular, the ripple magnitude $\Delta V_X$ defines a serrated waveform having a peak-to-peak amplitude that decreases with load current. As the load current approaches zero, the peak-to-peak amplitude approaches half of the maximum peak-to-peak amplitude. With a few modifications to the controller, it is also possible to get the $\Delta V_X$ ripple to approach the maximum peak-to-peak amplitude as the load current approaches zero, as shown in FIG. 18.

Figure 18:
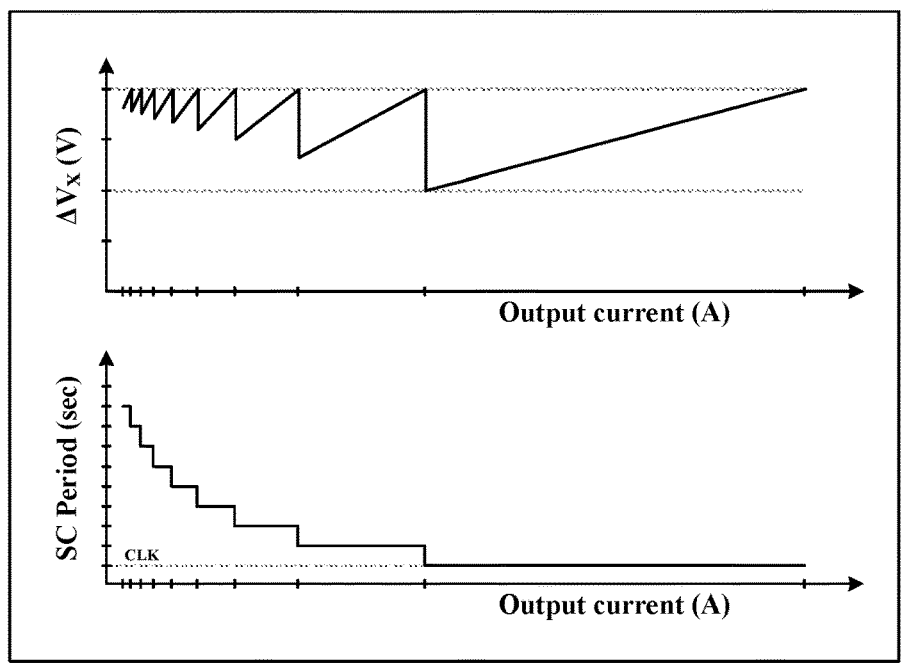

As is apparent from both FIGS. 17 and 18, as the load current increases, the switching period for the switches 41, 43, 46, 48, 42, 44, 45, 47 stays the same for a range of output currents. Within this range of output currents, the converter relies on the regulating circuit 16A to make up the difference between the voltage that the switching network 12A provides whatever voltage is required. At some point, the regulating circuit 16A can no longer make the necessary correction. At that point, the period takes a step down.

The controller 20A shown in FIG. 12 is a single-phase converter. As such, the first control signal φ is a two-dimensional vector and the second control signal PWM is a scalar. In the case of an N-phase converter, the first control signal φ is a 2N-dimensional vector and the second control signal PWM is an N-dimensional vector having components $PWM_1$, $PWM_2$, .... $PWM_n$ that are phase shifted relative to each other. Typically, the phase shift between these components is 360/N degrees.

Figure 19:
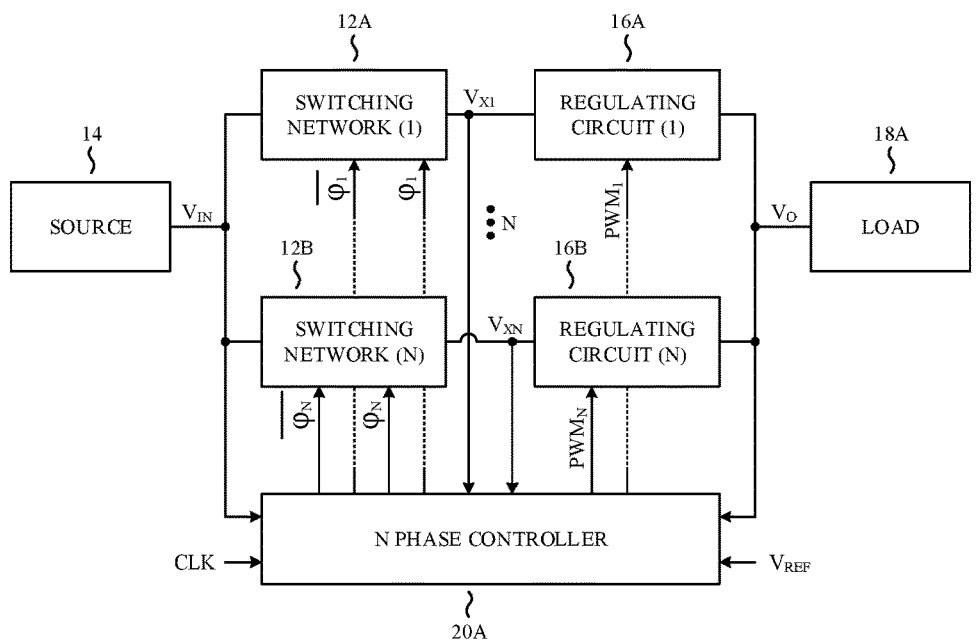
FIG. 19 shows a multi-phase converter similar to that shown in FIG. 12.

FIG. 19 shows an example of an N-phase converter having plural regulation circuits 16A, 16B. Each regulation circuit 16A, 16B has a corresponding switching network 12A, 12B. Each regulation circuit 16A, 16B is also driven by its own control signal, hence the need for an N-dimensional second control signal PWM. Each switching network 12A, 12B is driven by a pair of phases, hence the need for a 2N-dimensional first control signal.

An N-phase controller 20A controls the N-phase converter. The N-phase controller 20A is similar to the single-phase controller in FIG. 12 but with additional inputs for the N intermediate voltages $V_{X1}, V_{X2}, \ldots V_{XN}$.

Figure 20:
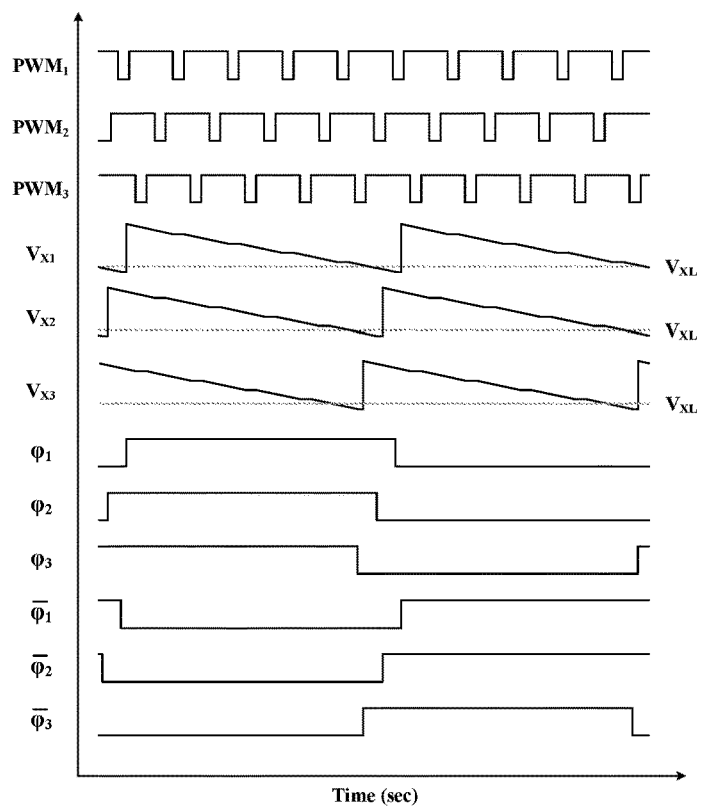
FIGS. 20 and 21 show signals present during operation of the control circuitry of FIG. 19.

FIG. 20 shows waveforms similar to those shown in FIG. 14 but for a three-phase version of the controller shown in FIG. 12.

As shown in FIG. 20, the second control signal PWM consists of second control signal elements $PWM_1$, $PWM_2$, $PWM_3$ that are separated from each other by a delay time that corresponds to a 120° phase shift between them. The three intermediate voltages $V_{X1}$, $V_{X2}$, $V_{X3}$ are shifted from each other by an integer multiple of this delay time. In FIG. 20, the integer is unity. However, as shown in FIG. 21, other integers are possible.

Because the periods of the intermediate voltages $V_{X1}$, $V_{X2}$, $V_{X3}$ are longer than those of the second control signal elements $PWM_1$, $PWM_2$, $PWM_3$, shifting them by the delay time will not cause them to be 120 degrees out of phase with each other. In fact, because their period is so much longer, a shift by this delay time only causes a very small phase shift in the intermediate voltages $V_{X1}$, $V_{X2}$, $V_{X3}$.

Figure 21:
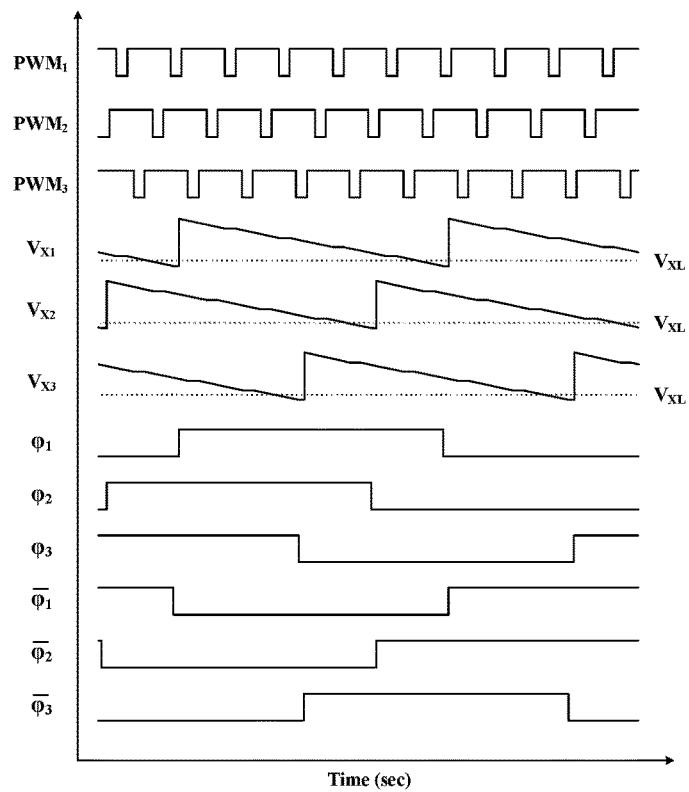

FIG. 21 shows an alternative method of operation similar to that shown in FIG. 20, but with the intermediate voltages $V_{X1}$, $V_{X2}$, $V_{X3}$ having been shifted by a larger multiple of the delay time. This results in a more significant phase shift between the intermediate voltages $V_{X1}$, $V_{X2}$, $V_{X3}$, a result of which is a reduced ripple in the output voltage $V_O$.

A multi-phase controller 20A for controlling the N-phase converter shown in FIG. 19 can be thought of as N single phase controllers 20A as shown in FIG. 13 operating in parallel but with a specific phase relationship between them. A multi-phase controller 20A would thus look very similar to the one in FIG. 13, but with an additional input and output signals. In general, the intermediate voltages ($V_{X1}$, $V_{X2}, \ldots V_{XN}$) and the output voltage $V_O$ are required for proper operation of the controller 20A.

In FIG. 12, a non-capacitive regulating circuit 16A loads down the switching network 12A. This regulating circuit 16A is switched at a high frequency. The components from the high-frequency switching of the regulating circuit 16A are ultimately superimposed on the lower frequency serrated waveform of the intermediate voltage $V_X$, as shown in sixth trace on FIG. 14. The duty cycle of the saw-tooth approximation waveform depends on the topology of the switching network 12A. In general, the frequency of the complementary switching-network control signals varies with changes in response to changes in the slope of the intermediate signal. These changes, in turn, arise as a result of changes in the power converter's operating point.

The switching network 12A and the regulating circuit 16A are essentially modular and can be mixed and matched in a variety of different ways. As such, the configuration shown in FIG. 11 represents only one of multiple ways to configure one or more switching networks 12A with one or more regulating circuits 16A to form a multi-stage DC-DC converter 10 of a power converter.

For example, FIG. 22 shows a bidirectional version of FIG. 11 in which power can flow either from a voltage source 14 to a load 18A or from the load 18A to the voltage source 14 as indicated by the arrows.

There are two fundamental elements described in connection with the following embodiments: switching networks 12A and regulating circuits 16A. Assuming series connected elements of the same type are combined, there are a total of four basic building blocks. These are shown FIGS. 22, 23, 24, and 26. The power converters disclosed herein include at least one of the four basic building blocks. More complex converter can be realized by combining the fundamental building blocks.

The first building block, shown in FIG. 22, features a switching network 12A whose output connects to an input of a regulating circuit 16A. The second building block, shown in FIG. 23, features a first switching network 12A whose output connects to a regulating circuit 16A, an output of which connects to an input of a second switching network 12B. In the third building block shown in FIG. 24, an output of a regulating circuit 16A connects to an input of a switching network 12A. A fourth building block, shown in FIG. 27, features a first regulating circuit 300A having an output that connects to an input of a first switching network 200, an output of which connects to an input of a second regulating circuit 300B.

Additional embodiments further contemplate the application of object-oriented programming concepts to the design of power converters by enabling switching networks 12A and regulating circuits 16A to be "instantiated" in a variety of different ways so long as their inputs and outputs continue to match in a way that facilitates modular assembly of power converters having various properties.

The switching network 12A in many embodiments is instantiated as a switched-capacitor network. Among the more useful switched capacitor topologies are: Ladder, Dickson, Series-Parallel, Fibonacci, and Doubler, all of which can be adiabatically charged and configured into multi-phase networks. A particularly useful switching capacitor network is an adiabatically charged version of a full-wave cascade multiplier. However, diabatically charged versions can also be used.

As used herein, changing the charge on a capacitor "adiabatically" means causing an amount of charge stored in that capacitor to change by passing the charge through a non-capacitive element. A positive adiabatic change in charge on the capacitor is considered adiabatic charging while a negative adiabatic change in charge on the capacitor is considered adiabatic discharging. Examples of non-capacitive elements include inductors, magnetic elements, resistors, and combinations thereof.

In some cases, a capacitor can be charged adiabatically for part of the time and diabatically for the rest of the time. Such capacitors are considered to be adiabatically charged. Similarly, in some cases, a capacitor can be discharged adiabatically for part of the time and diabatically for the rest of the time. Such capacitors are considered to be adiabatically discharged.

Diabatic charging includes all charging that is not adiabatic and diabatic discharging includes all discharging that is not adiabatic.

As used herein, an "adiabatically charged switching network" is a switching network having at least one capacitor that is both adiabatically charged and adiabatically discharged. A "diabatically charged switching network" is a switching network that is not an adiabatically charged switching network.

The regulating circuit 16A can be instantiated as any converter with the ability to regulate the output voltage. A buck converter for example, is an attractive candidate due to its high efficiency and speed. Other suitable regulating circuits 16A include boost converters, buck/boost converters, fly-back converters, forward converters, half-bridge converters, full-bridge converters, Cuk converters, resonant converters, and linear regulators. The fly-back converter can more specifically be a quasi-resonant fly-back converter, or an active-clamp fly-back converter, or an interleaved fly-back converter, or a two-switch fly-back converter. Likewise, the forward converter can be more specifically a multi-resonant forward converter, or an active-clamp forward converter, or an interleaved forward converter, or a two-switch forward converter. And, the half-bridge converter can more specifically be an asymmetric half-bridge converter, or a multi-resonant half-bridge converter, or a LLC resonant half-bridge.

In the embodiment shown in FIG. 22, a source voltage 14 provides an input to a first switching network 12A, which is instantiated as a switching capacitor network. The output of the first switching network 12A is a lower voltage than the input voltage that is provided to a regulating circuit 16A (e.g. a buck, a boost, or a buck/boost converter). This regulating circuit 16A provides a regulated input voltage to a second switching network 12B, such as another switching capacitor network. A high voltage output of this second switching network 12B is then applied to a load 18A.

An embodiment such as that shown in FIG. 22 can be configured to regulate the load 18A or to regulate the voltage source 14 depending on the direction of energy flow.

Figure 24:
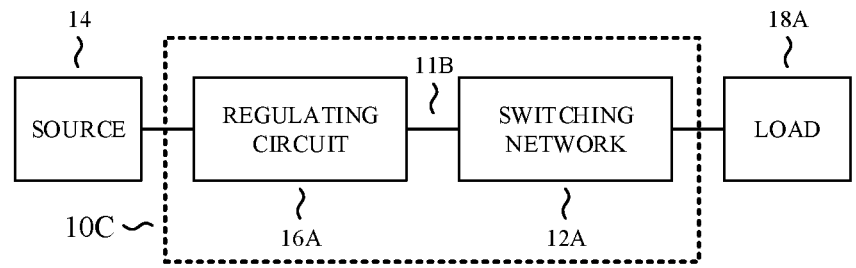

In another embodiment, shown in FIG. 24, a low voltage source 14 connects to an input of a regulating circuit 16A, the output of which is provided to an input of a switching network 12A to be boosted to a higher DC value. The output of the switching network is then provided to a load 18A.

An embodiment such as that shown in FIG. 24 can be used to regulate the voltage source 14 or the load 18A depending on the direction of energy flow.

Figure 25:
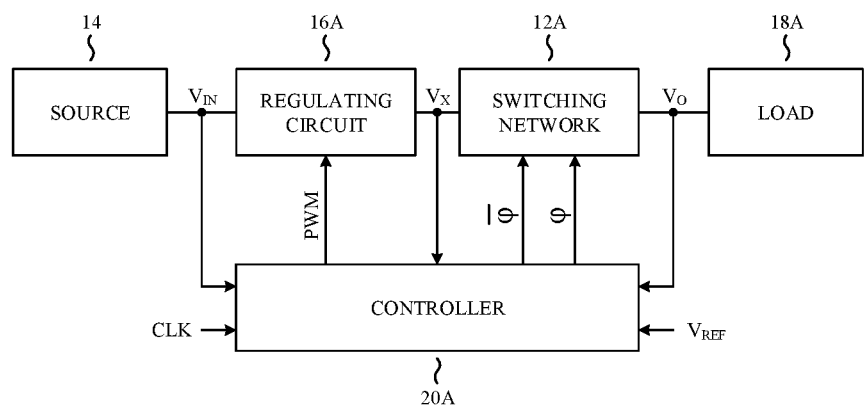
FIG. 25 shows a DC-DC converter like that shown in FIG. 24 with a controller.

FIG. 25 shows the modular DC-DC converter 10C of FIG. 24, but with a controller 20A explicitly shown. The controller 20A is similar to that described in connection with FIG. 13.

As was discussed in connection with FIG. 13, the controller 20A features three sensor inputs, one for an intermediate voltage $V_X$, one for the output voltage $V_O$, and an optional one for the input voltage, $V_{IN}$. The controller 20A also has two inputs that are not sensor inputs. One non-sensor input receives a clock signal CLK and the other receives a reference voltage $V_{REF}$. The clock signal CLK is used to set the period of a second control signal PWM and the reference voltage $V_{REF}$ is used to set the desired output voltage. Based on these inputs, the controller 20A outputs a first control signal having two phases to the switched-capacitor element 12A and a second control signal PWM to control switching of the regulating circuit 16A. This second control signal PWM is a pulse-width modulated signal.

Figure 26:
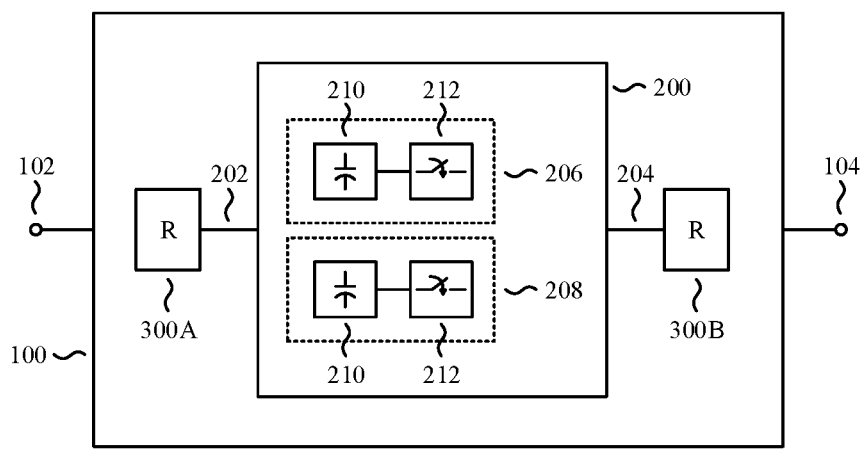
FIG. 26 shows another configuration of a DC-DC converter.

Referring now to FIG. 26, another embodiment of a converter 100 includes a first regulating circuit 300A connected to a converter input 102 and a second regulating circuit 300B connected to a converter output 104. Between the first and second regulating circuits 300A, 300B is a switching network 200 having a switching network input 202 and a switching network output 204. The switching network 200 includes charge storage elements 210 interconnected by switches 212. These charge storage elements 210 are divided into first and second groups 206, 208.

Figure 27:
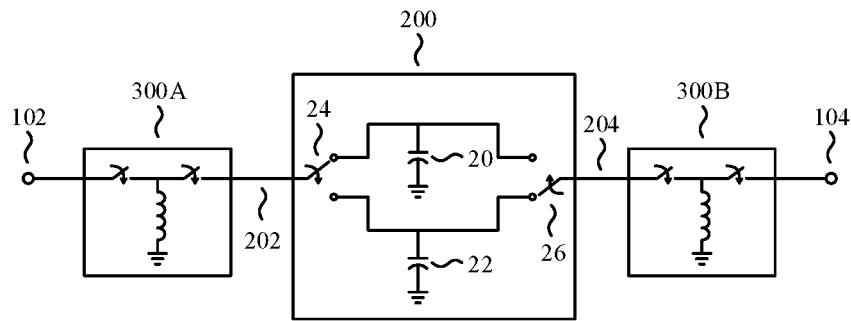
FIG. 27 shows a particular implementation of the power converter illustrated in FIG. 26.

In some embodiments, the switching network 200 is a bidirectional switching capacitor network such as that shown in FIG. 27.

The switching capacitor network in FIG. 27 features a first capacitor 20 and a second capacitor 22 in parallel. A first switch 24 selectively connects one of the first and second capacitors 20, 22 to a first regulating circuit 300A, and a second switch 26 selectively connects one of the first and second capacitors 20, 22 to the second regulating circuit 300B. Both the first and second switches 24, 26 can be operated at high frequency, thus facilitating the adiabatic charging and discharging of the first and second capacitors 20, 22.

The particular embodiment shown in FIG. 27 has a two-phase switching network 200. However, other types of switching networks can be used instead.

Figure 28:
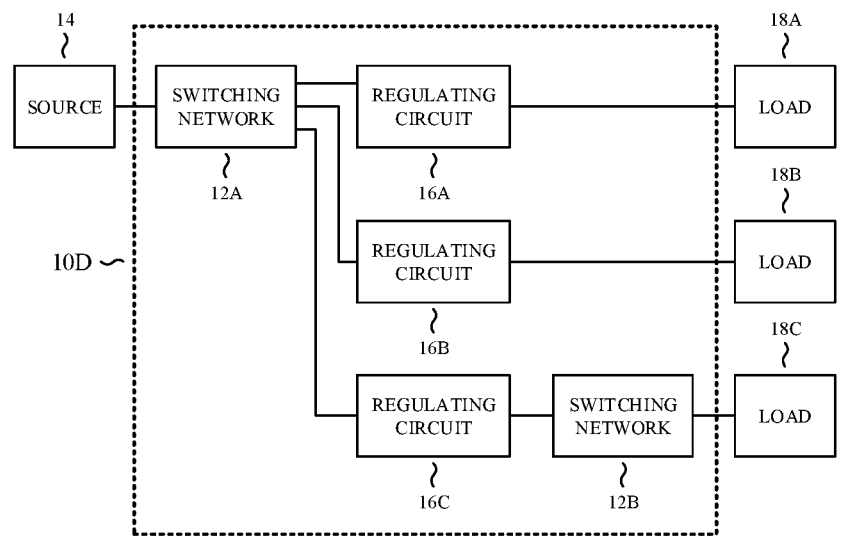
FIG. 28 shows an embodiment with multiple regulating circuits.

In yet another embodiment, shown in FIG. 28, multiple regulating circuits 16A, 16B, 16C are provided at an output of a first switching network 12A for driving multiple loads 18A-18C. For one of the loads 18C, a second switching network 12B is provided between the load 18C and the corresponding regulating circuit 16C thus creating a pathway similar to that shown in FIG. 24. FIG. 28 thus provides an example of how the modular construction of regulating circuits and switching networks facilitates the ability to mix and match components to provide flexibility in DC-DC converter construction.

A switched-capacitor power converter includes a network of switches and capacitors. By cycling the network through different topological states using these switches, one can transfer energy from an input to an output of the switched-capacitor network. Some converters, known as "charge pumps," can be used to produce high voltages in FLASH and other reprogrammable memories.

Figure 29:
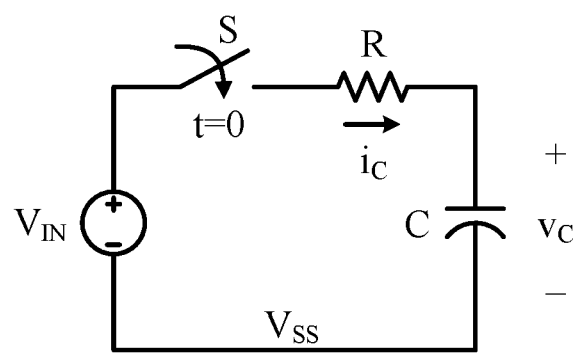
FIG. 29 shows an RC circuit.

To help understand the loss mechanisms in switched capacitor converters, it is instructive to first analyze the classical capacitor charging problem, as depicted in FIG. 29.

FIG. 29 shows a capacitor C initially charged to some value $V_C$ (0). At t=0 the switch S is closed. At that instant, a brief surge of current flows as the capacitor C charges to its final value of $V_{IN}$. The rate of charging can be described by a time constant τ=RC, which indicates the time it takes the voltage to either rise or fall to within 1/e of its final value. The instantaneous values for voltage across the capacitor $v_c$ (t) and current through the capacitor $i_c$ (t) are given by the following equations:

$$v_c(t) = v_c(0) + [V_{in} - v_c(0)](1 - e^{-t/RC}),$$

and $$i_c(t) = C\frac{dv_c}{dt} = \frac{V_{in} - v_c(0)}{R}e^{-t/RC},$$

The energy loss incurred while charging the capacitor can be found by calculating the energy dissipated by resistor R, which is $$E_{loss}(t) = \int_{t=0}^{\infty} i_R(t) \times v_R(t) dt = \int_{t=0}^{\infty} [i_c(t)]^2 R\, dt.$$

The equation can be further simplified by substituting the expression for $i_c$ (t) into the equation above. Evaluating the integral then yields $$E_{loss}(t) = \frac{1}{2}[V_{in} - v_c(0)]^2 C[1 - e^{-2t/RC}].$$

It is apparent therefore that the only term that involves the resistance is in a decaying exponential. Thus, if the transients are allowed to settle (i.e. t→∞), the total energy loss incurred in charging the capacitor is independent of its resistance R. In that case, the amount of energy loss is equal to $$E_{loss}(\infty) = \frac{1}{2}C\Delta v_c^2.$$

Figure 30:
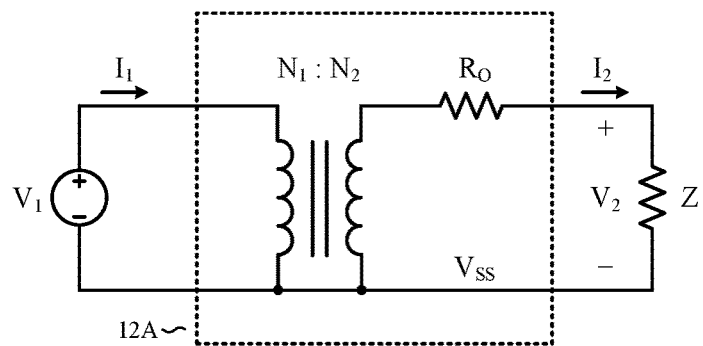
FIG. 30 shows a model of a switched capacitor DC-DC converter.

A switched-capacitor converter can be modeled as an ideal transformer, as shown in FIG. 30, with a finite output resistance $R_o$ that accounts for the power loss incurred in charging or discharging of the energy transfer capacitors, as shown in FIG. 30. The embodiment shown in FIG. 30 is non-isolated because the negative terminals on both sides of the transformer are connected. However, this is by no means required. As an example, FIG. 31 shows an embodiment in which the same terminals are not connected, in which case the converter is isolated.

It should be noted that the transformer shown is only for modeling purpose. A converter of this type would generally not have windings wrapped around an iron core. The power losses associated with charging and discharging are typically dissipated in the ON resistance of the MOSFETs and equivalent series resistance of the capacitors.

The output voltage of the switched-capacitor converter is given by $$V_o = V_{in} \frac{N_2}{N_1} - I_o R_o.$$

There are two limiting cases where the operation of switched capacitor converters can be simplified and $R_o$ easily found. These are referred to as the "slow-switching limit" and the "fast-switching limit."

In the fast-switching limit ($\tau \gg T_{sw}$), the charging and discharging currents are approximately constant, resulting in a triangular AC ripple on the capacitors. Hence, $R_o$ is sensitive to the series resistance of the MOSFETs and capacitors, but is not a function of the operating frequency. In this case, $R_o$ of the converter operating in the fast-switching limit is a function of parasitic resistance and $R_o$ is given by:

$$R_o|_{\tau \ll T_{sw}} = R_{FSL} = n \sum_{i \in sw} \sum_{j=1}^{n} R_i (a_{r,i}^j)^2.$$

Although it tends to under-estimate $R_o$, a useful approximation for $R_o$ that serves as a good starting point in the design process is given by $$R_o(f) \approx \sqrt{R_{FSL}^2 + R_{SSL}^2}.$$

In the slow-switching limit, the switching period $T_{sw}$ is much longer than the RC time constant $\tau$ of the energy transfer capacitors. Under this condition, a systemic energy loss given by $\frac{1}{2} C \times \Delta V_c^2$ occurs regardless of the resistances of the capacitors and switches. This systemic energy loss arises in part because the root mean square (RMS) of the charging and discharging current is a function of the RC time constant. Under these circumstances, $R_o$ is given by $$R_o|_{\tau \gg T_{sw}} = R_{SSL} = \sum_{i \in caps} \sum_{j=1}^{n} \frac{(a_{c,i}^j)^2}{2 C_i f_{sw}}.$$

Figure 32:
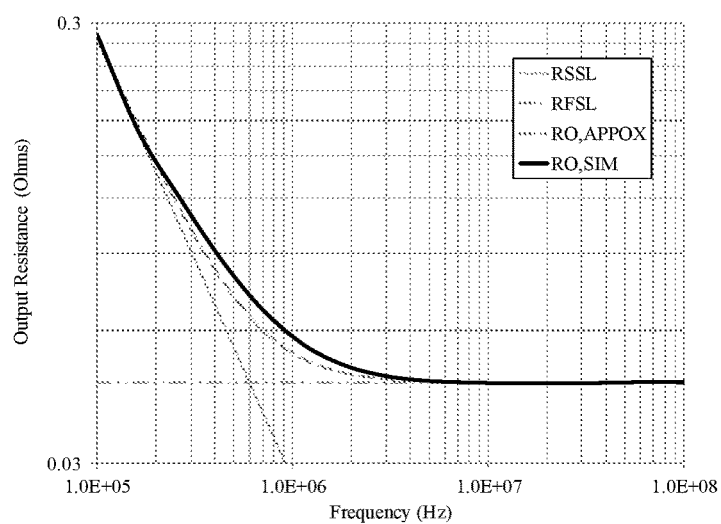
FIG. 32 shows output resistance of a switched-capacitor network as a function of switching frequency.

The behavior of output resistance as a function of frequency can be appreciated by inspection of FIG. 32, which shows that as frequency increases, the output resistance drops in a manner consistent with the $1/f_{sw}$ term and that at higher frequencies, the output resistance settles down to a steady value.

The calculations for $R_{SSL}$ and $R_{FSL}$ given above are based on the charge multiplier vector concept. The vector $a^1$ through $a^n$ can be obtained by inspection for any standard well posed n-phase converter. The charge multiplier vectors are computed using constraints imposed by Kirchoff's current law in each topological state along with the steady-state constraint that the n charge multiplier quantities must sum to zero on each capacitor.

Once $R_o$ is known, the conduction loss $P_{cond}$ can be calculated by $$P_{cond} = I_o^2 R_o.$$

Additionally, other losses such as switching losses, driver losses, and control losses can be calculated. Preferably, the switching loss is comparable to conduction loss. These losses, which originate from charging and discharging the transistor nodes, are given by $$P_{sw} = W_{sw} f_{sw} = (W_{ds} + W_{on} + W_g) f_{sw}$$

where $W_g$ is the gate capacitance loss, $W_{on}$ is the overlap or commutation loss, and $W_{ds}$ is the output capacitance loss. Thus the total converter loss can be calculated using $$P_{loss} = I_o^2 R_o + W_{sw} f_{sw} + P_{etc}.$$

Once $R_o$ and the additional loss mechanisms have been determined, the total efficiency of the converter is given by $$\eta_{sc} = \frac{P_o}{P_o + P_{loss}} = \frac{P_o}{P_o + P_{cond} + P_{sw} + P_{etc}}.$$

To optimize efficiency of the switched-capacitor converter, the optimal switching frequency, capacitance, and device sizes must be selected. If the switching frequency is too low, then the conduction losses, $P_{cond}$, dominate. On the other hand, if the switching frequency is too high, then $P_{sw}$ dominates. Although doing so tends to decrease output ripple, rarely will a switched-capacitor converter operate far above the transitional region between the slow switching limit and fast switching limit. After all, operating above this region tends to increase switching losses without lowering the output resistance to compensate for those increases switching losses. Thus, there is little to gain by operating above that region.

If the effective resistance $R_{eff}$ of the charging path is reduced, for example by reducing the RC time constant, the RMS current increases and it so happens that the total charging energy loss ($E_{loss} = I_{RMS}^2 R_{eff} = \frac{1}{2} C \times \Delta V_{C2}$) is independent of $R_{eff}$. One solution to minimize this energy loss is to increase the size of the pump capacitors in the switched capacitor network.

Although many switched-capacitor networks can provide a specific voltage transformation, most of them are impractical for a variety of reasons. A practical switched-capacitor network typically has a large transformation ratio, low switch stress, low DC capacitor voltage, and low output resistance. Suitable topologies for the converters described herein include Ladder, Dickson, Series-Parallel, Fibonacci, and Doubler topologies.

Figure 33:
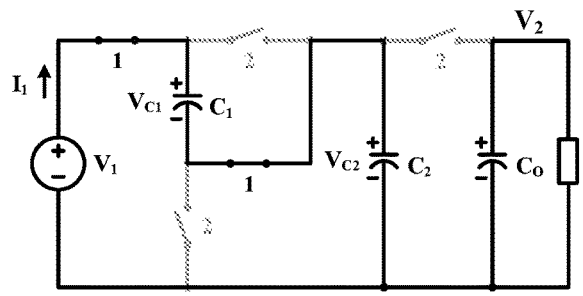
FIGS. 33-34 show a series-parallel SC converter operating in charge phase and discharge phase respectively.
Figure 34:
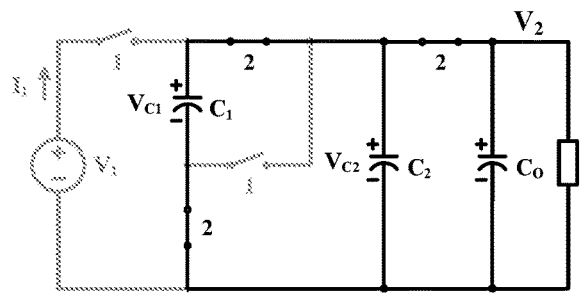

One useful converter is a series-parallel switched capacitor converter. FIGS. 33-34 show a 2:1 series-parallel switched-capacitor converter operating in charge phase and in discharge phase respectively. During the charge phase, the capacitors are in series. In the discharge phase, the capacitors are in parallel. In its charge phase the capacitor voltages $v_{C1}$ and $v_{C2}$ add up to $V_1$ while in its discharge phase $v_{C1}$ and $v_{C2}$ equal $V_2$. This means that $V_2 = V_{1/2}$.

Another useful family of switched-capacitor topologies is that first discovered by Greinacher and popularized by Cockcroft, Walton, and Dickson. An example of such a topology is that shown in FIGS. 35 and 36. In both charge pumps, the source is located at $V_1$ and the load is located at $V_2$. In these types of charge pumps, packets of charge are pumped along a diode chain as the coupling capacitors are successively charged and discharged. As shown in FIG. 37, clock signals $V_{clk}$ and $\overline{V_{clk}}$ with amplitude $v_{pump}$ are 180 degrees out of phase. The coupling capacitors can either be pumped in series or parallel.

It takes n clock cycles for the initial charge to reach the output. The charge on the final pump capacitor is n times larger than the charge on the initial pump capacitor. Thus, $V_2$ for the converters in FIG. 36 is $V_1+(n-1)\times v_{pump}$ in both pumping configurations.

Although the foregoing topologies are suitable for stepping up voltage, they can also be used to step down voltage by switching the location of the source and the load. In such cases, the diodes can be replaced with controlled switches such as MOSFETs and BJTs.

Figure 35:
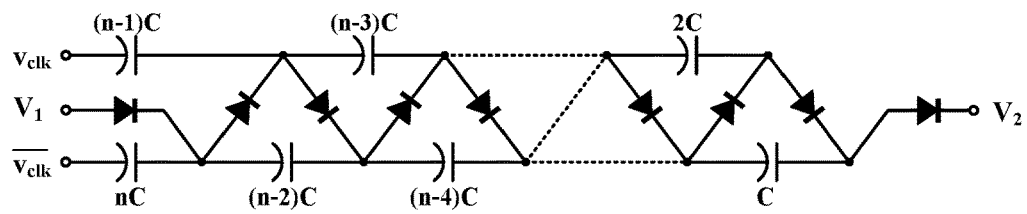
FIG. 35 shows a series pumped symmetric cascade multiplier with diodes.
Figure 36:
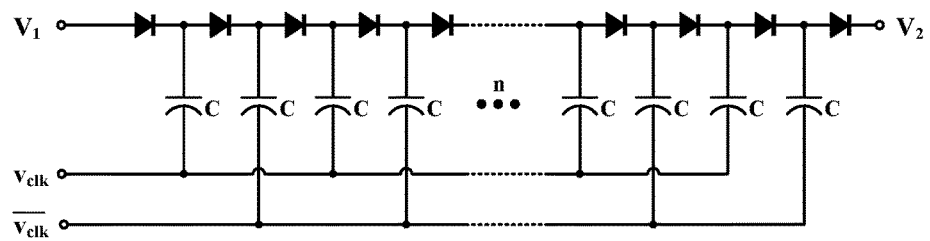
FIG. 36 shows a parallel pumped symmetric cascade multiplier with diodes.
Figure 37:
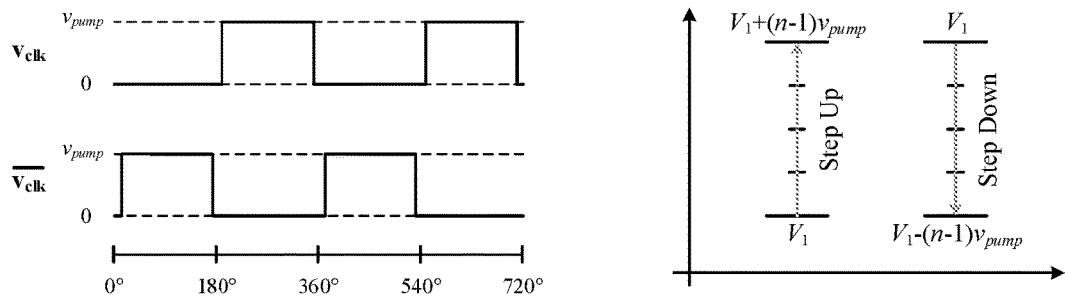
FIG. 37 shows charge pump signals.

FIGS. 35 and 36 show topologies that transfer charge during only one phase of the clock signal. Such topologies are referred to as "half-wave" topologies because charge transfer only occurs during half of a clock cycle. A disadvantage of a half-wave topology is a discontinuous input current.

It is possible to convert the topologies shown in FIGS. 35 and 36 so that they transfer charge during both phases of the clock signal. This can be carried out by connecting two such topologies in parallel and driving them 180 degrees out of phase. Such a topology is referred to herein as a "full-wave" topology because charge transfer occurs in both halves of the clock cycle.

Figure 38:
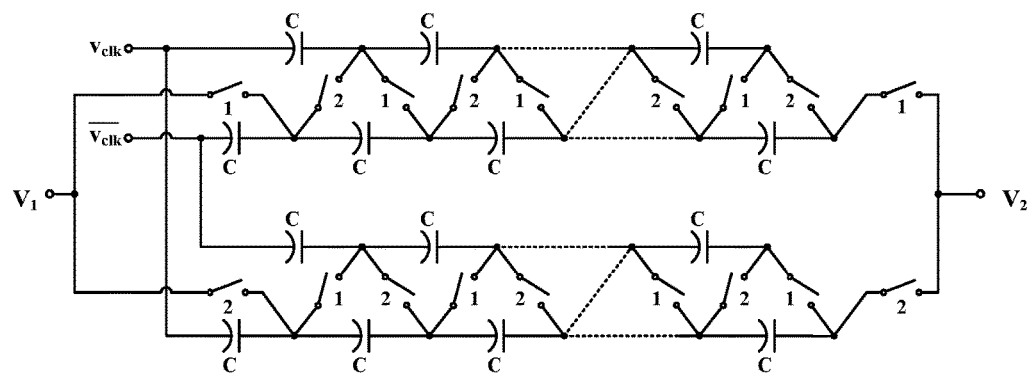
FIG. 38 shows a two-phase symmetric series pumped cascade multiplier with switches.
Figure 39:
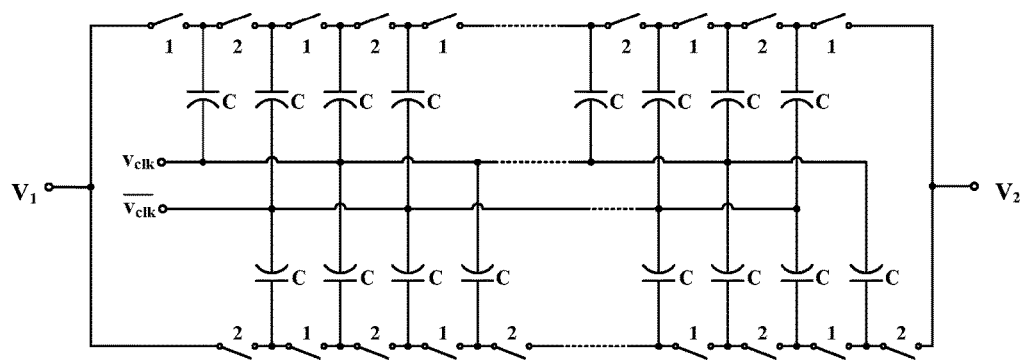
FIG. 39 shows a two-phase symmetric parallel pumped cascade multiplier with switches.

FIG. 38 show a topology derived from that shown in FIG. 35, but modified so that charge transfer occurs in both phases of the clock signal. FIG. 39 show a topology derived from that shown in FIG.36, but modified so that charge transfer occurs in both phases of the clock signals. Instead of diodes, as shown in the topologies of FIGS. 35 and 36, the topologies shown in FIGS. 38 and 39 use switches. Unlike diodes, which are inherently unidirectional, the switches shown in FIG. 38 and FIG. 39 are bidirectional. As a result, in the topologies shown in FIGS. 38 and 39, power can flow either from the $V_1$ terminal to the $V_2$ terminal or vice versa. As such, these topologies can be used to step-up a voltage or step-down a voltage.

In the topologies shown thus far, there are two chains of switches, each of which is pumped. However, it is also possible to pump only one of the two switch chains. Such topologies are referred to as "asymmetric."

In asymmetric topologies, half of the capacitors are used to support a DC voltage and not to transfer energy. However, these embodiments do not require that each switch endure such a high peak voltage. In particular, the peak voltage in the case in which only one switch chain is being pumped is only half of what it would be if both switch chains were actually being pumped. In these asymmetric topologies, the sole switch chain that is being used to transfer energy can be modified to transfer charge during both phases of the clock signal using principles set forth in connection with FIG. 38.

Figure 40:
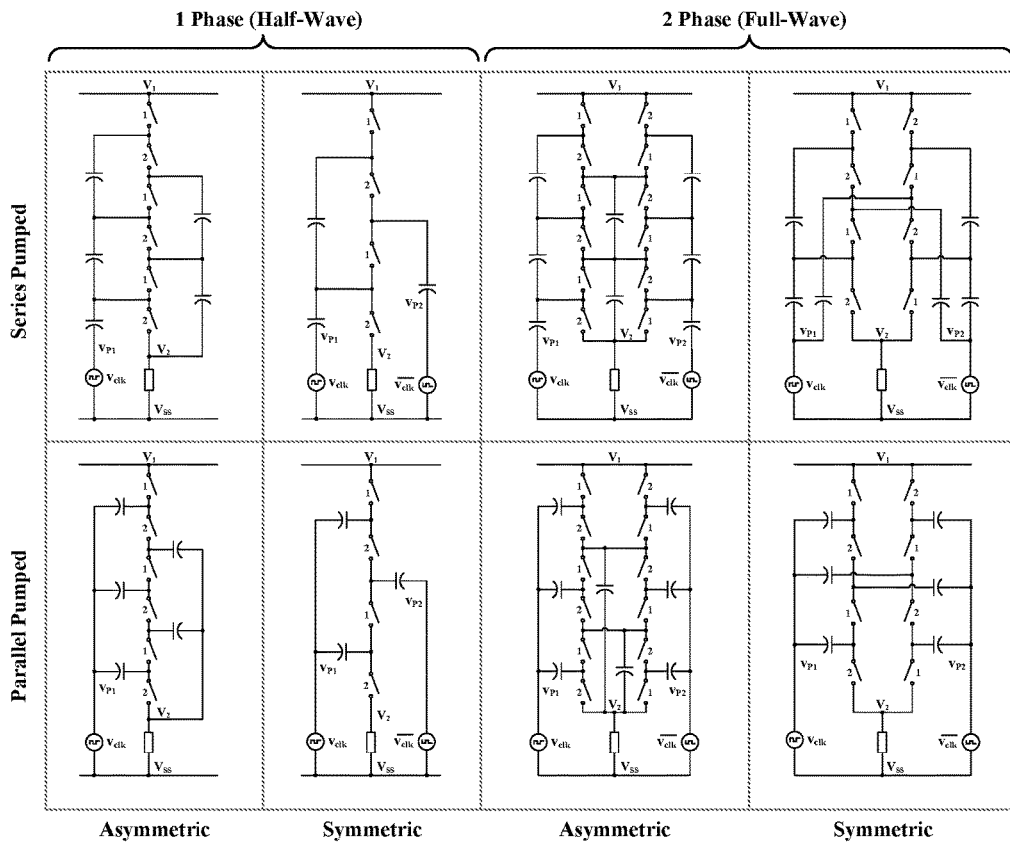
FIG. 40 shows four different cascade multipliers along with corresponding half-wave versions.

FIG. 40 shows eight exemplary topologies that use the principles set forth in connection with FIGS. 35-39. The first and second columns show half-wave topologies in both asymmetric and symmetric configurations, whereas the third and fourth columns show full-wave wave topologies in both asymmetric and symmetric configurations. The topologies shown in FIG. 40 can be further modified to combine N phases in parallel and to run them 180 degrees/N out of phase. Doing so reduces output voltage ripple and increases output power handling capability.

The basic building blocks in the modular architecture shown FIGS. 22, 23, 24, and 26 can either be connected as independent entities or coupled entities. In the situation where switching networks and regulating circuits are tightly coupled, it is possible to prevent and/or reduce the systemic energy loss mechanism of the switching networks through adiabatic charging. This generally includes using a regulating circuit to control the charging and discharging of the capacitors in the switching network. Furthermore, the output voltage of the regulating circuit and thus the total converter can be regulated in response to external stimuli. One approach to regulating the output voltage is by controlling the average DC current in the magnetic storage element.

In general, it is desirable for the regulating circuit to operate in a way that limits the root mean square (RMS) current through the capacitors in the switching network. The regulating circuit can do so using either resistive elements or magnetic storage elements. Because resistive elements consume power, magnetic storage elements are generally preferable for this purpose. Therefore, embodiments described herein rely on a combination of switches and a magnetic storage element in the regulating circuit to limit RMS current in the switching network.

To limit RMS current, the regulating circuit forces the capacitor current through the magnetic storage element in a regulating circuit that has an average DC current. The regulating circuit's switches then operate so as to maintain an average DC current through the magnetic storage element.

The regulating circuit may limit both the RMS charging current and the RMS discharging current of at least one capacitor in the switching network. A single regulating circuit may limit the current into or out of the switching network by sinking and/or sourcing current. Therefore, there are four fundamental configurations, which are shown in FIGS. 22, 23, 24, and 26.

Assuming power flows from source to load then, in FIG. 22, the regulating circuit 16A may sink both the charging and discharging current of the switching network 12A.

Figure 23:
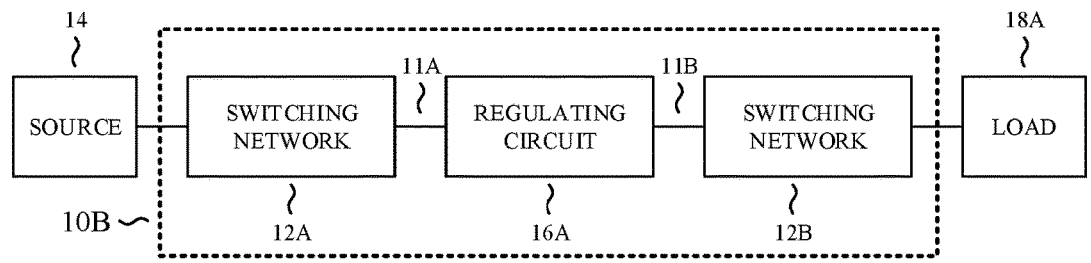
FIGS. 23-24 show DC-DC converters with alternate configurations of regulating circuits and switching networks.

In FIG. 23, the regulating circuit 16A may source both the charging and discharging current of the switching network 12B while also sinking both the charging and discharging current of the switching network 12A. Furthermore, if both the switching networks and the regulating circuits allow power to flow in both directions, then bidirectional power flow is possible.

In FIG. 24, the regulating circuit 16A may source both the charging and discharging current of the switching network 12A.

In FIG. 26, the regulating circuit 300A may source the charging current of switching network 200 and the regulating circuit 300B may sink the discharging current of the same switching network 200 and vice-versa.

A fundamental difficulty that afflicts switched-capacitor networks is that the mere act of charging a capacitor incurs energy loss. This energy loss depends a great deal on how much the voltage across the capacitor changes as a result of the charging event. The energy loss $E_L$ associated with using a fixed voltage source at a voltage V to charge a capacitance C from zero to V is $\frac{1}{2}CV^2$. This loss does not depend on the parasitic series resistance R. Since this loss arises whenever voltage changes, every charging interval during operation incurs a loss equal to $½C\Delta V^2$, where $\Delta V$ corresponds to the difference between the initial and final value of the capacitor voltage.

The fixed charge-up loss cannot be reduced by employing switches with lower on-state resistance. Known ways to reduce it simply avoid causing the voltage to change very much during operation. This is why such converters operate most efficiently only at certain conversion ratios.

Since the amount of charge transferred into or out of a charging cycle is the product of the voltage difference and the capacitance, one way to transfer a great deal of charge with only a small voltage difference is to make the capacitance very large. However, large capacitors are not without disadvantages. For one thing, a large capacitance consumes a great deal of physical area. Additionally, switched-capacitor networks with large capacitances are not so amenable to efficient operation.

A converter as described herein overcomes the foregoing disadvantage by providing more efficient use of the capacitors. This means that capacitors can be made smaller and/or that there will be an overall improvement in system efficiency. Although a converter as described herein does not require a reconfigurable switched-capacitor circuit, it may nevertheless take advantage of one as described above.

Figure 41:
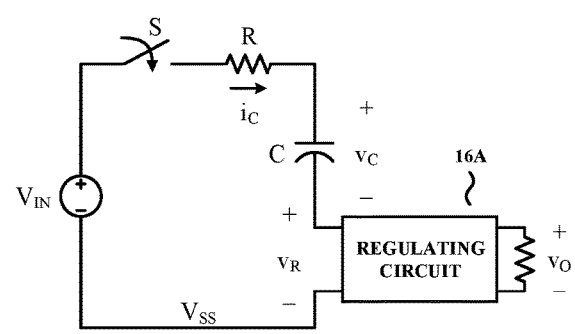
FIG. 41 shows the circuit of FIG. 29 with an auxiliary converter used to reduce loss associated with charging a capacitor.

FIG. 41 illustrates a method for improving the charge-up efficiency of the capacitor C shown in FIG. 29 after switch S closes. The regulating circuit 16A adiabatically charges the capacitor C. In some embodiments, the regulating circuit 16A is a switch-mode converter that supplies an output. A suitable regulating circuit is a low-voltage magnetic based converter.

In the system shown in FIG. 41, while the capacitor C charges, most of the difference between the input voltage $V_{IN}$ and the capacitor stack voltage $V_C$ appears across the input of the regulating circuit 16A. Instead of being dissipated as heat in a parasitic resistor R, the energy associated with charging the capacitor stack is delivered to the output of the regulating circuit 16A instead. Therefore, a majority of the capacitor-charging energy can be recovered (i.e., redirected to the load) by making the apparent input resistance of the regulating circuit 16A higher than the parasitic resistor R.

The embodiment shown in FIG. 41 thus permits more efficient use of capacitors than that shown in FIG. 29. This enables reduction in the required capacitor size and/or improvement in system efficiency when extended to switched-capacitor converters.

Figure 42:
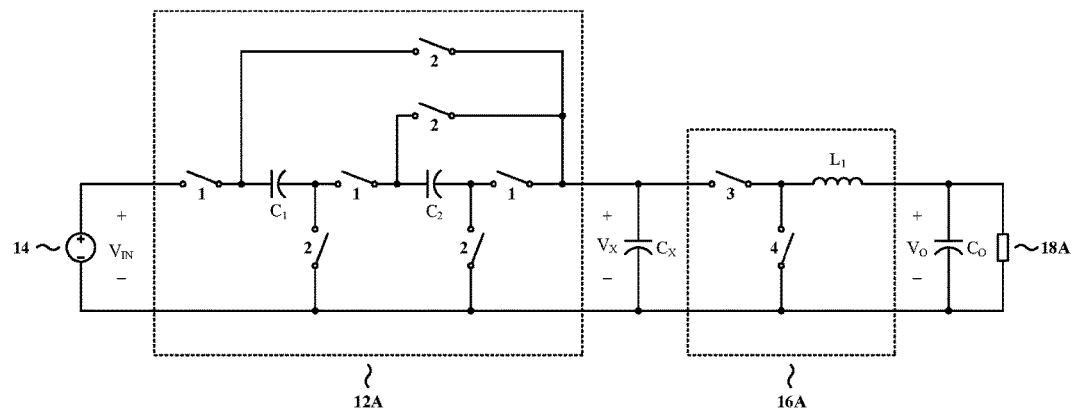
FIG. 42 shows an implementation of the circuit of FIG. 41.

FIG. 42 illustrates one implementation of the foregoing embodiment in which a switching network 12A connects to regulating circuit 16A that serves as both a means to adiabatically charge/discharge the capacitors in the switching network 12A and regulate the output voltage $V_O$. Please note, the regulating circuit 16A need not be at a higher frequency than the switching network to promote adiabatic operation; it can even be at a lower frequency. In the particular embodiment shown, the regulating circuit 16A is a synchronous buck converter and the switching network 12A is a single-phase series-parallel converter. The switching network 12A features first switches 1 that open and close together, second switches 2 that also open and close together, a first pump capacitor $C_1$, and a second pump capacitor $C_2$.

The regulating circuit 16A includes a filter capacitor $C_X$ that serves only as a filter and bypass for the regulating circuit 16A. Consequently, the capacitance of the filter capacitor $C_X$ should be much smaller than that of the first and second pump capacitors $C_1$ and $C_2$ of the switching network 12A.

The switching network 12A alternates between being in a charging state and a discharging state. During the charging state, it charges the first and second pump capacitors $C_1$, $C_2$. Then, during the discharging state, it discharges the first and second pump capacitors $C_1$, $C_2$ in parallel.

In the charging state, the first switches 1 close and the second switches 2 open. The difference between the input voltage $V_{IN}$, and the sum of the voltages across the first and second pump capacitors $C_1$, $C_2$ appears across the input terminal of the regulating circuit 16A. As a result, the first and second pump capacitors $C_1$, $C_2$ charge with low loss, and at a rate determined by the power drawn from the regulating circuit 16A to control the system output.

Similarly, in the discharging state, the second switches 2 close and the first switches 1 open. The switching network 12A then discharge in parallel at a rate based on the power needed to regulate the output.

Another embodiment relies on at least partially adiabatically charging full-wave cascade multipliers. Cascade multipliers are a preferred switching network because of their superior fast-switching limit impedance, ease of scaling up in voltage, their two phase operation, and low switch stress.

Figure 43:
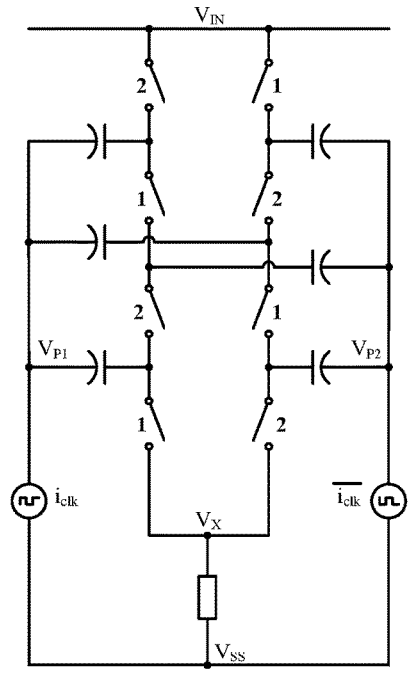
FIG. 43 shows a cascade multiplier with clocked current sources.

In cascade multipliers, the coupling capacitors are typically pumped with a clocked voltage source $v_{clk}$ & $\overline{v_{clk}}$. However, if the coupling capacitors are pumped with a clocked current source $i_{clk}$ & $\overline{i_{clk}}$ instead, as shown in FIG. 43, then the RMS charging and discharging current in the coupling capacitor may be limited. In this case, the capacitors are at least partially charged adiabatically thus lowering, if not eliminating, the $½C\Delta V_c^2$ loss that is associated with a switched-capacitor converter when operated in the slow-switching limit. This has the effect of lowering the output impedance to the fast-switching limit impedance. As shown by the black dotted line in FIG. 44, which depicts adiabatic operation under full adiabatic charging, the output impedance would no longer be a function of switching frequency.

With all else being equal, an adiabatically charged switched-capacitor converter can operate at a much lower switching frequency than a conventionally charged switched-capacitor converter, but at higher efficiency. Conversely, an adiabatically charged switched-capacitor converter can operate at the same frequency and with the same efficiency as a conventionally charged switched-capacitor converter, but with much smaller coupling capacitors, for example between four and ten times smaller.

Figure 45:
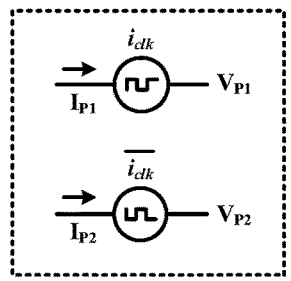
FIGS. 45, 46, and 47 show clocked current sources.

Embodiments described herein can operate with two clocked current sources $i_{clk}$, $\overline{i_{clk}}$ that operate 180 degrees out of phase, as shown in FIG. 45. One implementation, shown in FIG. 46, uses one current source 72, a first switch pair 1 and a second switch pair 2. The first and second switch pairs 1, 2 are best synchronized with a switch chain. A suitable implementation of the current source in FIG. 46 is an inductance, represented in FIG. 47 by an inductor L.

Figure 46:
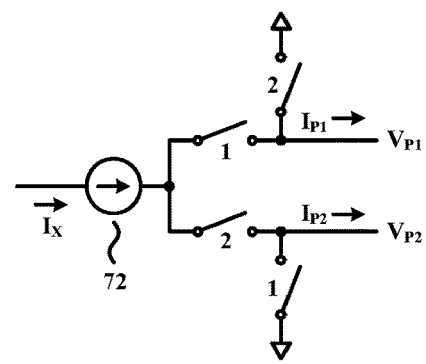
Figure 47:
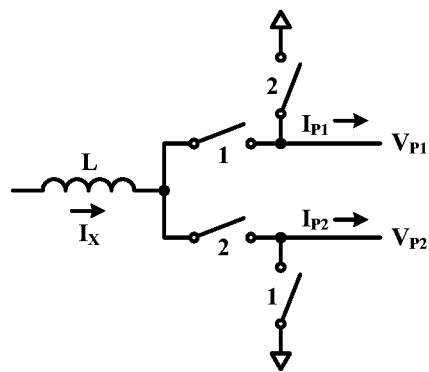
Figure 48:
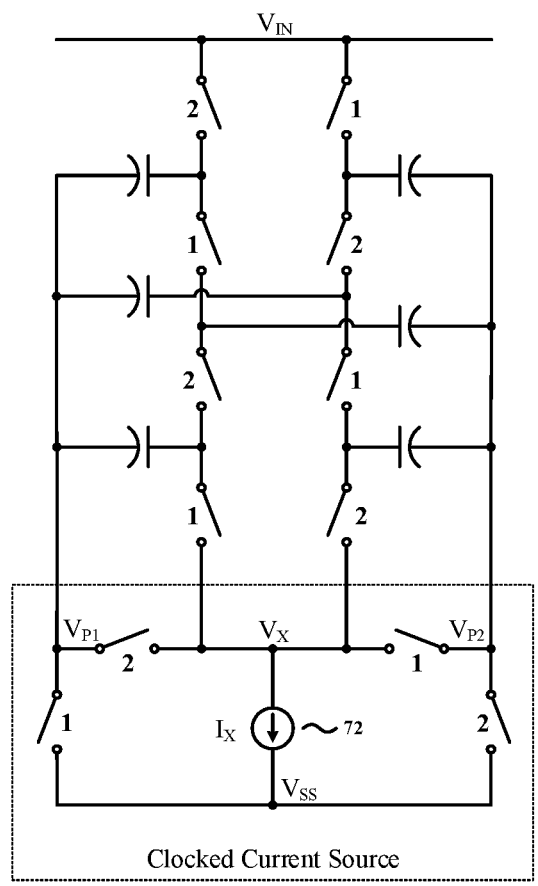
FIG. 48 shows a cascade multiplier with the clocked current source of FIG. 46.

FIG. 48 shows the cascade multiplier of FIG. 43 with the clocked current sources in FIG. 46. There are numerous ways of implementing the current source 72. These include buck converters, boost converters, fly-back converter, resonant converters, and linear regulators. In some embodiments, a power converter having a constant input current implements the constant current source. In other embodiments, a power converter that has a constant input current for a portion of an interval defined by the reciprocal of its switching frequency implements the constant current source. In yet other embodiments, a linear regulator implements the constant current source.

Figure 49:
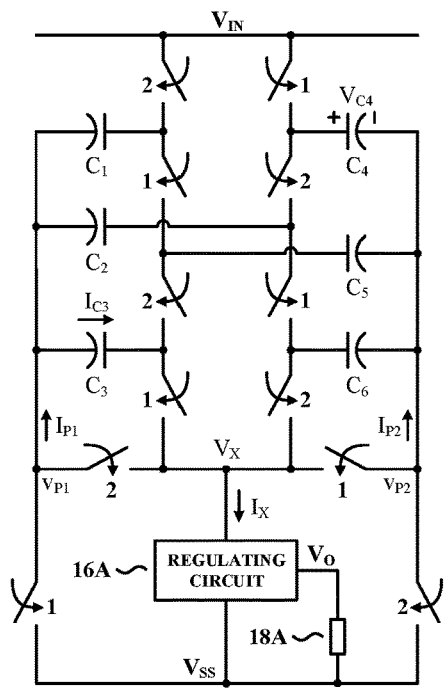
FIG. 49 shows a particular implementation of the DC-DC converter illustrated in FIG. 22 with a full-wave adiabatically charged switching network.

FIG. 49 shows a step-down converter consistent with the architecture shown in FIG. 22. However, in this embodiment, a switching network 12A is adiabatically charged using a regulating circuit 16A. The clocked current sources $i_{clk}$ & $\overline{i_{clk}}$ are emulated by four switches and the regulating circuit 16A. The output capacitor $C_O$ has also been removed so as to allow $V_X$ to swing. In this example, the regulating circuit 16A is a boost converter that behaves as constant source with a small AC ripple. Any power converter that has a non-capacitive input impedance at the frequency of operation would have allowed adiabatic operation. Although switch-mode power converters are attractive candidates due to their high efficiency, linear regulators are also practical.

Figure 50:
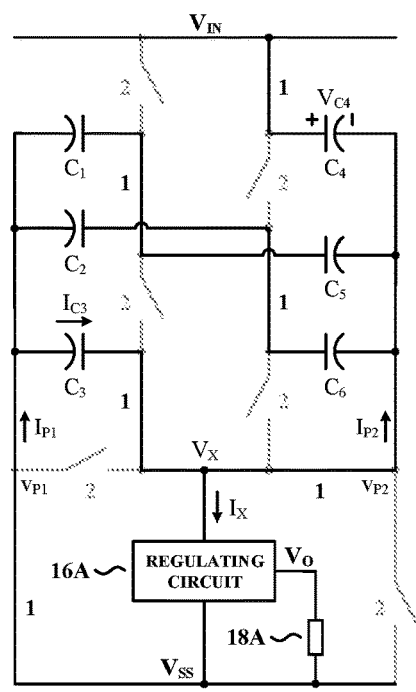
FIG. 50 shows the DC-DC converter illustrated in FIG. 48 during phase A.
Figure 51:
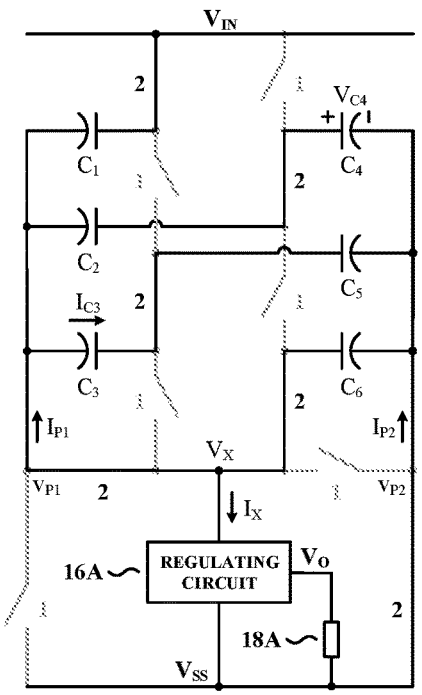
FIG. 51 shows the DC-DC converter illustrated in FIG. 48 during phase B.

In operation, closing switches labeled "1" charges capacitors $C_4$, $C_5$, and $C_6$ while discharging capacitors $C_1$, $C_2$, and $C_3$. Similarly, closing switches "2" has the complementary effect. The first topological state (phase A) is shown in FIG. 49, where all switches labeled "1" are closed and all switches labeled "2" are opened. Similarly, the second topological state (phase B) is shown in FIG. 50, where all switches labeled "2" are closed and all switches labeled "1" are opened.

In this embodiment, the regulating circuit 16A limits the RMS charge and discharging current of each capacitor. For example, capacitor $C_3$ is discharged through the filter inductor in the regulating circuit 16A during phase A, while capacitor $C_3$ is charged through the filter inductor in regulating circuit 16A during phase B, clearly demonstrating the adiabatic concept. Furthermore, all of the active components are implemented with switches so that the converter can process power in both directions.

Figure 52:
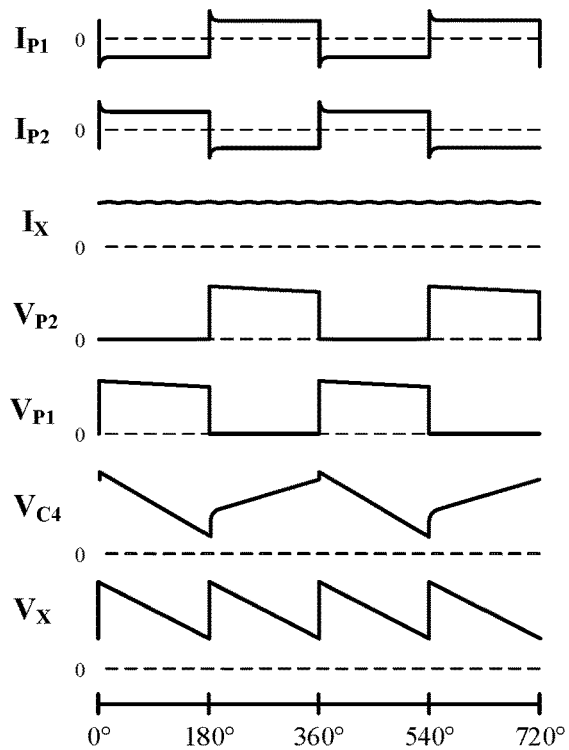
FIG. 52 shows various waveforms associated with a 4:1 adiabatically charged converter.

A few representative node voltages and currents are shown in FIG. 52. There is a slight amount of distortion on the rising and falling edges of the two illustrated currents ($I_{P1}$ and $I_{P2}$), but for the most part, the currents resemble two clocks 180 degrees out of phase. In general, adiabatic charging occurs in cascade multipliers if at least one end of a switch stack is not loaded with a large capacitance, as is the case in this embodiment, where the $V_X$ node is loaded down by regulating circuit 16A.

In operation, different amounts of current will flow through different switches. It is therefore useful to size the switches in a manner appropriate to the currents that will be flowing through them. For example, the switches connected to $V_{P1}$ and $V_{P2}$ carry more current then the other switches in FIG. 49. By making these switches larger than the other switches, this avoids the need to have unnecessarily large switches and thus results in a smaller circuit footprint. This also avoids unnecessary additional capacitive losses, which are proportional to the size of the switch.

Figure 44:
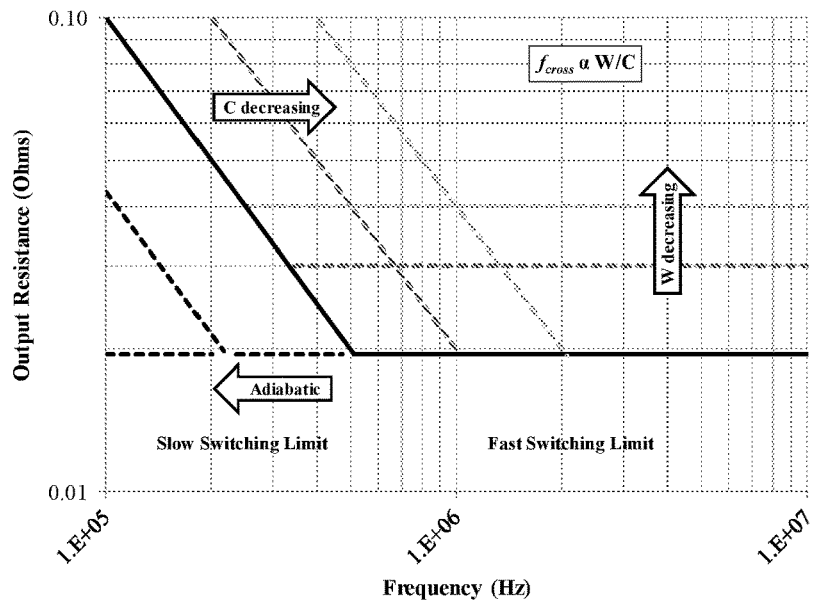
FIG. 44 shows output impedance of a switched-capacitor converter as a function of frequency.

The switches shown in FIG. 49 will transition between states at some switching frequency. It is desirable that, in order to reduce loss, the switching network 12A operate such that the RMS current through the switches is constrained at that switching frequency. One way to ensure that this is the case is to choose the resistances of the switches such that they are so large that the RC time constant of the charge transfer between the capacitors is similar if not longer than the switching frequency. As can be seen in FIG. 44, by controlling the width "W" of the switches and hence their resistance and their size, the switching network 12A can be forced into the fast-switching limit region.

Unfortunately, by using the resistance of the switches to constrain the RMS current, conductive power losses increase and the overall efficiency decreases. The regulating circuit 16A, however, allows us to reduce the resistance of the switches and operate adiabatically. Therefore, the switches can be optimally sized for the highest efficiency without worrying about constraining the RMS current since it is handled by the regulating circuit 16A (or optionally a magnetic filter). The optimal size for each switch is chosen by balancing the resistive and capacitive losses in each switch at a given switching frequency and at a given current.

The modular architecture with the basic building blocks shown in FIGS. 11, 23, 24, and 26 may be expanded to cover a wider range of applications, such as high-voltage DC, AC-DC, AC-AC, buck-boost, and multiple output voltages. Each of these applications includes separating the transformation and regulation functions. Extension of the architecture can also incorporate adiabatically charged switched-capacitor converters.

Figure 53:
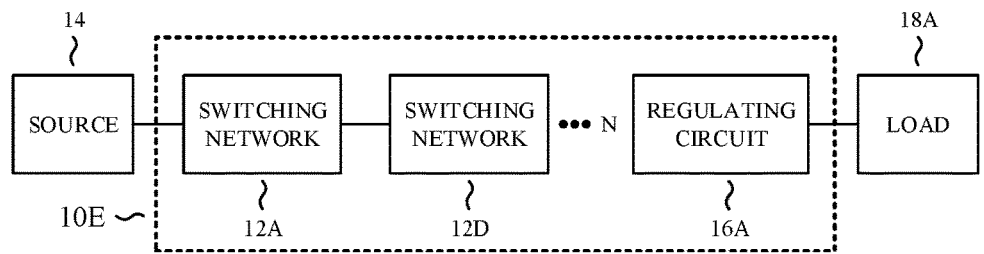
FIG. 53 shows adiabatic charging of series connected stages.

In many switched-capacitor converters, the number of capacitors and switches increases linearly with the transformation ratio. Thus, a large number of capacitors and switches are required if the transformation ratio is large. Alternatively, a large transformation ratio can be achieved by connecting numerous low gain stages in series as depicted in FIG. 53. The transformation ratio of the total switch capacitor stack ($V_{IN}/V_X$) is as follows:

$$\frac{V_{in}}{V_x} = N_1 \times N_2 ... N_n \tag{2.1}$$

The main disadvantage of the series stacked configuration is that the voltage stresses on the front stages are much higher than those of the rear stages. This will normally require stages with different voltage ratings and sizes. However, the transformation ratio can be easily changed by bypassing a stage or two.

Adiabatic charging of a preceding series-connected switching network only occurs if the following switching network controls the charging and discharging current of the preceding stage. Thus, it is preferable to use full-wave switched-capacitor converters in the front stages or to use switched-capacitor stages such as the single-phase series-parallel switched-capacitor converters with magnetic based filters.

Figure 54:
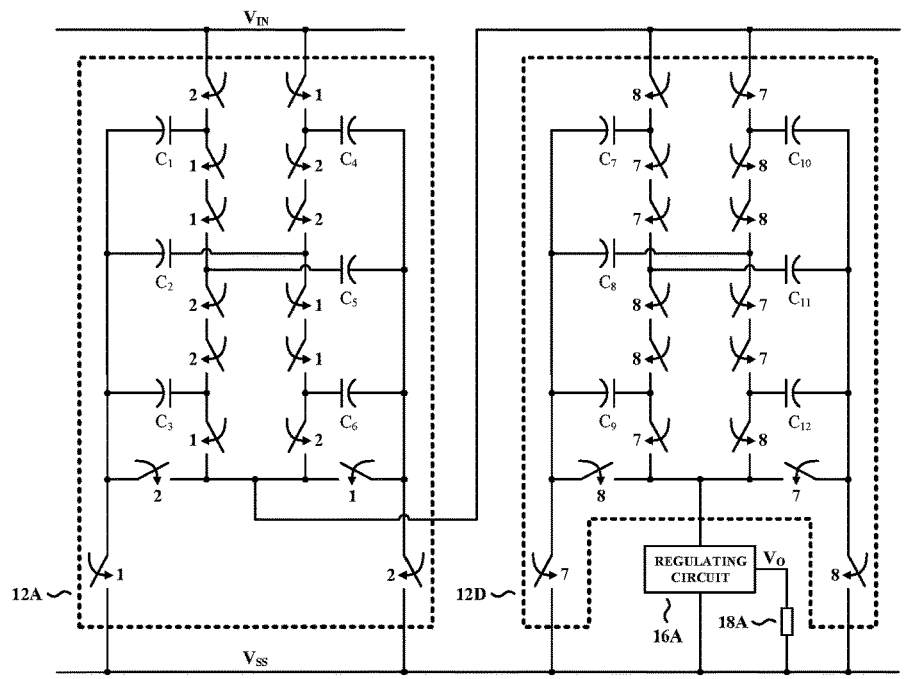
FIG. 54 shows a particular implementation of the power converter illustrated in FIG. 53.

FIG. 54 shows a converter with two series-connected switching networks consistent with the architecture shown in FIG. 53. Both switching networks 12A, 12D are two-phase cascade multipliers. In operation, switches labeled "1" and "2" are always in complementary states and switches labeled "7" and "8" are always in complementary states. Thus, in a first switched-state, all switches labeled "1" are open and all switches labeled "2" are closed. In a second switched-state, all switches labeled "1" are closed and all switches labeled "2" are opened. In this embodiment, closing switches 1 charges capacitors $C_1$, $C_2$, $C_3$, while discharging capacitors $C_4$, $C_5$, $C_6$ and closing switches 2 has the complementary effect. Also, closing switches 7 charges capacitors $C_7$, $C_8$, $C_9$, while discharging capacitors $C_{10}$, $C_{11}$, $C_{12}$ and closing switches 8 has the complementary effect.

The power converter provides a total step-down of 32:1, assuming the regulating circuit 16A is a buck converter with a nominal step-down ratio of 2:1. Furthermore, if the input voltage is 32 V and the output voltage is 1 V, then the switches in the first switching network 12A will need to block 8 volts while the switches in the second switching network 12D will need to block 2 volts.

Figure 55:
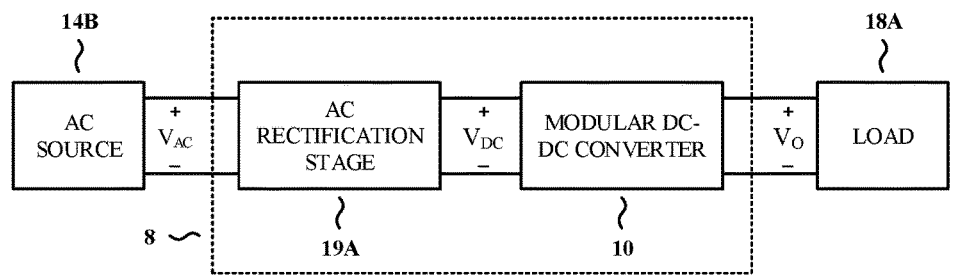
FIG. 55 shows an AC-DC power converter architecture.

The modular architecture with the basic building blocks shown in FIGS. 11, 23, 24, and 26 may be configured to handle an AC input voltage as shown in FIG. 55. An AC rectification stage 19A receives an AC waveform from an AC source 14B and provides an average DC voltage to a modular DC-DC converter 10, the output of which is connected to a load 18A. In this embodiment, the modular DC-DC converter 10 can be isolated or otherwise.

One of the main attributes of switched-capacitor converters is their ability to operate efficiency over a large input range by reconfiguring the switched-capacitor network. If the AC wall voltage (i.e. 60 Hz & 120 $V_{RMS}$) can be thought of as a slow moving DC voltage, then a front-end AC switching network 13A should be able to unfold the time-varying input voltage into a relatively stable DC voltage.

Figure 56:
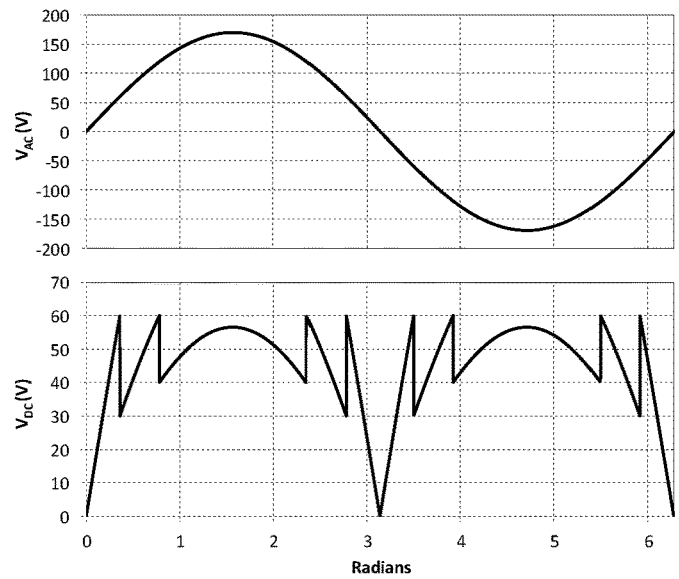
FIG. 56 shows an AC voltage rectified using a reconfigured switched-capacitor stage.
Figure 57:
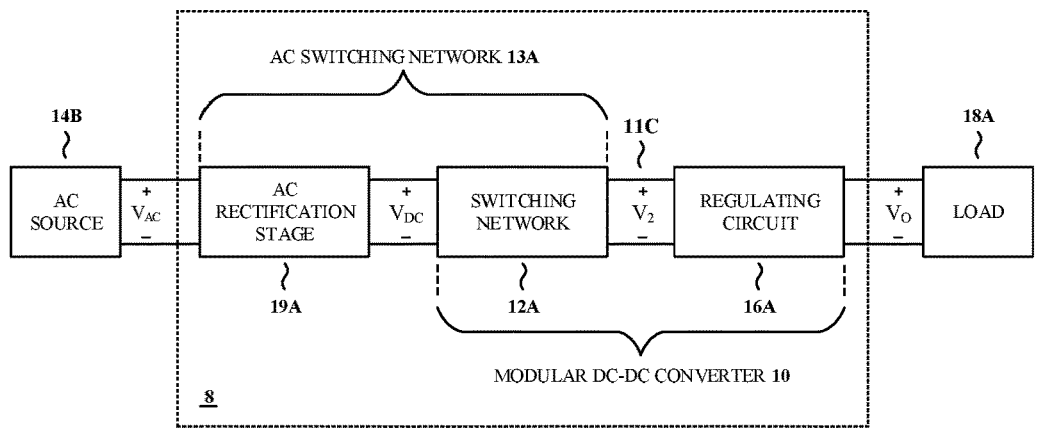
FIG. 57 shows an embodiment of the AC-DC power converter architecture in FIG. 55, which includes an AC switching network.

FIG. 56 shows a diagram of a 120 $V_{RMS}$ AC waveform over a single 60 Hz cycle overlaid with the unfolded DC voltage. FIG. 57 shows an AC switching network 13A of the sort that can incorporate the AC rectification stage 19A of FIG. 55. The AC switching network 13A is a front-end switched-capacitor stage (i.e., switching network) in combination with a selective inverting stage (i.e., rectifying stage). The front-end switched-capacitor stage has different configurations (1/3, 1/2, 1/1) at its disposal. In the particular embodiments shown, the AC switching network 13A keeps the DC voltage under 60 V. In some embodiments, the AC switching network 13A is a special-purpose adiabatic switched-capacitor network.

Once the AC switching network 13A has unfolded the AC voltage, a regulating circuit 16A, shown in FIG. 57, produces a final output voltage. In some embodiments, another switching network 16A between the AC switching network 13A and the regulating circuit 16A further conditions the voltage. If this is the case, then the caveats for series-connected stages hold true since the AC switching network 13A is a special purpose switching network 12A. Some form of magnetic or electric isolation is also common in AC-DC converters for safety reasons. Hence, in FIG. 57, voltages: $V_{AC}$, $V_{DC}$, and $V_O$ are purposely defined as being agnostic to a common ground.

Figure 58:
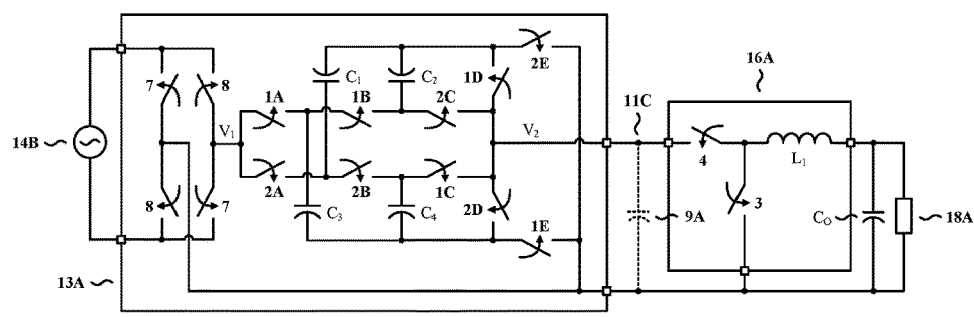
FIG. 58 shows a particular implementation of the AC-DC converter illustrated in FIG. 57.
Figure 59:
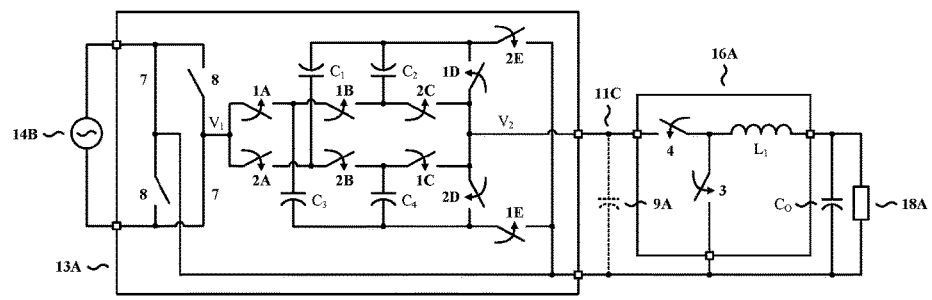
FIG. 59 shows the AC-DC converter illustrated in FIG. 58 during the positive portion of the AC cycle.
Figure 60:
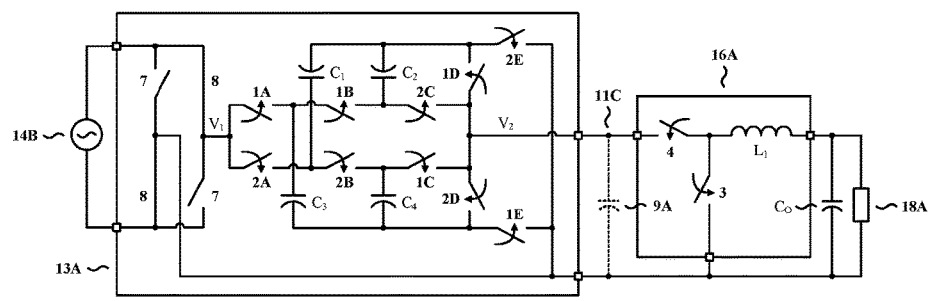
FIG. 60 shows the AC-DC converter illustrated in FIG. 58 during the negative portion of the AC cycle.

FIG. 58 shows an AC-DC converter corresponding to the architecture shown in FIG. 57. In this embodiment, the AC switching network 13A is a synchronous AC bridge rectifier followed by a reconfigurable two-phase step-down cascade multiplier with three distinct conversion ratios (1/3, 1/2, 1/1) while the regulating circuit 16A is a synchronous buck converter. In operation, switches labeled 7 and 8 are always in complementary states. During the positive portion of the AC cycle (0 to π radians) all switches labeled "7" are closed while all switches labeled "8" are opened as shown in FIG. 59. Similarly, during the negative portion of the AC cycle (π to 2π radians) all switches labeled 8 are closed while all switches labeled "7" are opened as shown in FIG. 60.

In addition to the inverting function provided by switches 7 and 8, switches 1A-1E and switches 2A-2E may be selectively opened and closed as shown in Table 1 to provide three distinct conversion ratios of: 1/3, 1/2, and 1.

The AC switching network 13A is provided with a digital clock signal CLK. A second signal CLKB is also generated, which may simply be the complement of CLK (i.e. is high when CLK is low and low when CLK is high), or which may be generated as a non-overlapping complement. With a switching pattern set in accordance with the first row of Table 1, the AC switching network 13A provides a step-down ratio of one-third (⅓). With a switching pattern set in accordance with the second row of Table 1, the AC switching network 13A provides a step-down ratio of one-half (½). With a switching pattern set in accordance with the third row of Table 1, the AC switching network 13A provides a step-down ratio of one.

Figure 61:
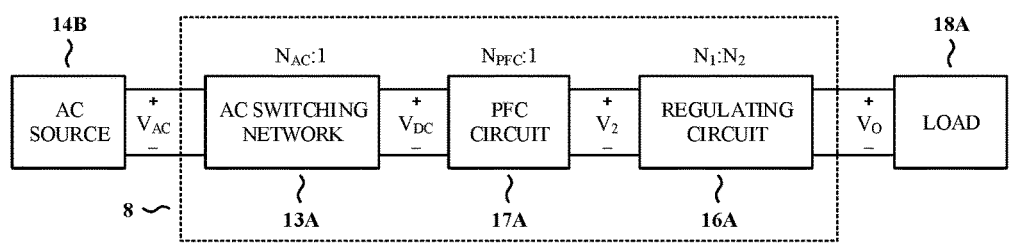
FIG. 61 shows an AC-DC power converter architecture with power-factor correction.

Most power supplies attached to the wall meet some power factor specification. Power factor is a dimensionless number between 0 and 1 that defines a ratio of the real power flowing to apparent power. A common way to control the harmonic current and thus boost the power factor is by using an active power factor corrector. FIG. 61 shows an AC-DC converter 8 that controls harmonic current and boosts power factor towards unity. The illustrated AC-DC converter 8 features an AC switching network 13A that receives an AC voltage from an AC source 14B and rectifies it. An output of the AC switching network 13A connects to an input of an active power-factor correction circuit 17A. The AC switching network 13A may also provide voltage transformation via a switched-capacitor circuit. The power-factor correction circuit 21A controls its input current so that it remains, to the greatest extent possible, in-phase with the voltage waveform provided by the AC source 14B. This drives reactive power toward zero. The output of the power-factor correction circuit 17A is then provided to a regulating circuit 16A that operates in the same way as shown in FIG. 57.

Figure 62:
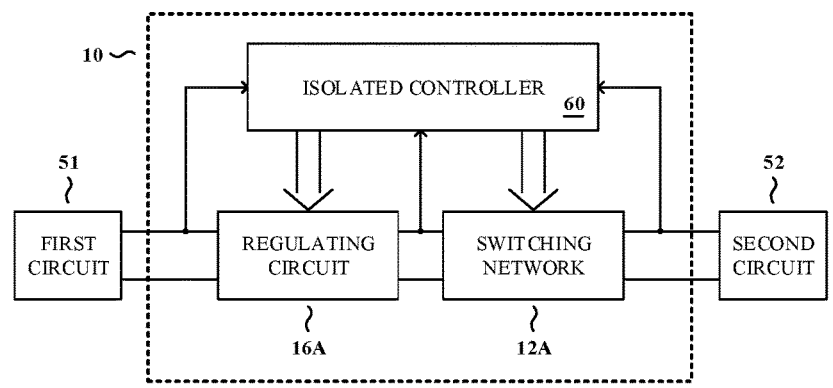
FIG. 62 shows a converter having an isolated controller.

FIG. 62 shows a particular embodiment of FIG. 55's modular DC-DC converter 10 connected between first and second circuits 51, 52. The first and second circuits 51, 52 can be a source, a load, or another circuit, such as a power converter, a PFC circuit, or an EMI filter.

The illustrated modular DC-DC converter 10 includes a regulating circuit 16A, a switching network 12A, and an isolated controller 60. As used herein, a circuit having an input and an output is considered isolated if the input voltage and the output voltage do not share a common ground. Such isolation can be carried out by having the input voltage correspond to an input voltage of a transformer and having the output voltage corresponds to an output voltage of a transformer. In some embodiments, the regulating circuit 16A is isolated. In other embodiments, it is the switching network 12A that is isolated. Although only one of the foregoing is needed to consider the modular DC-DC converter 10 as a whole isolated, there are also embodiments in which both the switching network 12A and the regulating circuit 16A are isolated.

In some embodiments, the switching network 12A is an unregulated switched-capacitor converter having a fixed voltage-conversion ratio. These embodiments generally include a regulating circuit 16A to regulate the output of the switching network 12A. Examples of a suitable regulating

TABLE 1

| $V_2/V_1$ | 1A | 1B | 1C | 1D | 1E | 2A | 2B | 2C | 2D | 2E |
|---|---|---|---|---|---|---|---|---|---|---|
| 1/3 | CLK | CLK | CLK | CLK | CLK | CLKB | CLKB | CLKB | CLKB | CLKB |
| 1/2 | CLKB | CLK | CLK | CLK | CLK | CLK | CLKB | CLKB | CLKB | CLKB |
| 1/1 | ON | ON | ON | OFF | OFF | ON | ON | ON | OFF | OFF | circuit 16A include a boost converter, a buck converter, a fly-back converter, and a linear regulator.

Figure 63:
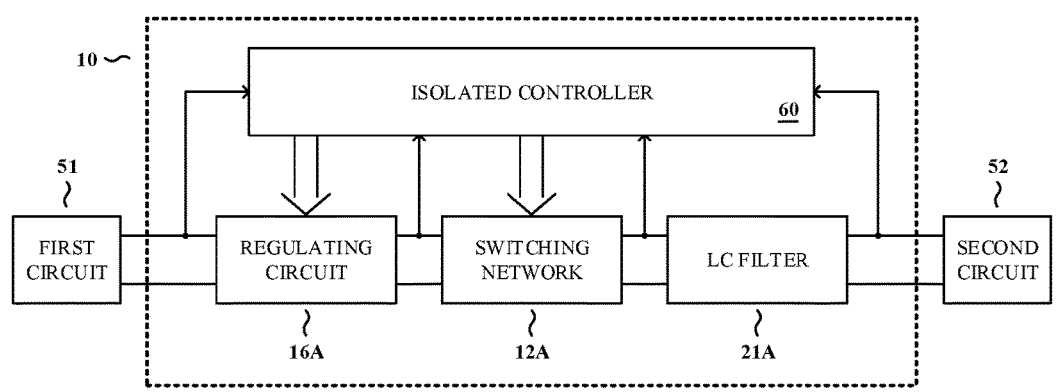
FIG. 63 shows an alternative architecture of the converter in FIG. 62 where the switching network is loaded by an LC filter.

FIG. 63 shows a variation of the converter shown in FIG. 62 in which an LC filter 21A is added between the switching network 12A and the second circuit 52. The purpose of the LC filter is to promote adiabatic charging of the switching network 12A via the method shown in FIG. 47.

Figure 64:
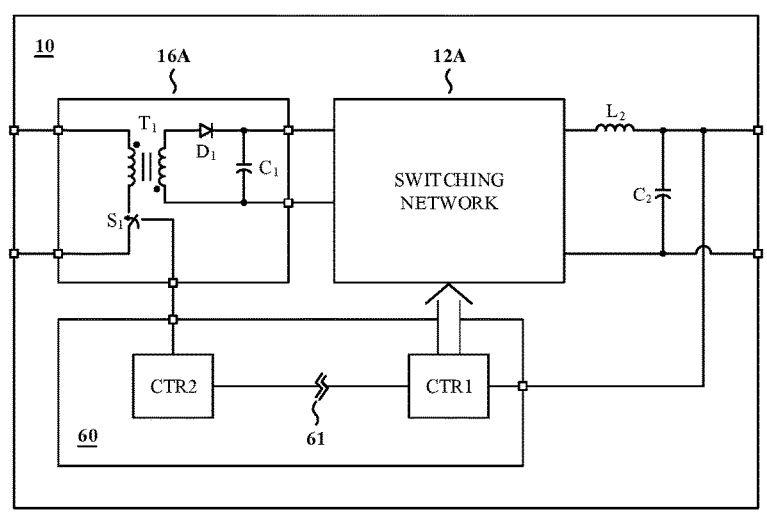
FIG. 64 shows a converter in which a control signal for the regulating circuit is isolated from a control signal for the switching network.

FIG. 64 shows a particular embodiment of the modular DC-DC converter 10 shown in FIG. 63. The regulating circuit 16A is implemented as a fly-back converter having a switch $S_1$, a diode $D_1$, a capacitor $C_1$, and a transformer $T_1$. When operating in continuous conduction mode, the regulating circuit 16A transitions between first and second states. In the first state, the switch $S_1$ is closed, and the diode $D_1$ does not conduct. During this first state, the capacitor $C_1$ acts as a charge reservoir to supply power to the output of the regulator 16A. In the second state, the switch $S_1$ is opened and the diode $D_1$ conducts.

As shown in FIG. 64, the isolated controller 60 includes a first control signal CTR1 that controls the switching network 12A, a second control signal CTR2 that controls the regulating circuit 16A, and an isolation barrier 61 between them. As a result, the first and second control signals CRT1, CTR2 have different grounds and connect to different sides of the transformer $T_1$. The isolation barrier 61 can include any one or more of sonic isolation, optical isolation, capacitive isolation, inductive isolation, and mechanical isolation.

Figure 65:
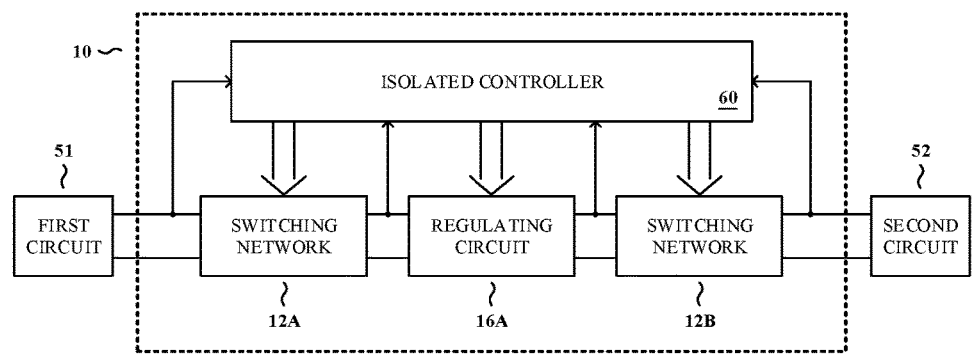
FIG. 65 shows a configuration of FIG. 23 with an isolated controller as shown in FIG. 64.

The embodiment shown in FIG. 23 can be modified to operate with an AC source 14B, as shown in FIG. 65, which shows a modular DC-DC converter 10 connected between first and second circuits 51, 52. The modular DC-DC converter 10 includes first and second switching networks 12A, 12B and a regulating circuit 16A. The first switching network 12A receives, at its input thereof, a voltage from the first circuit 51. The second switching network 12B provides its output to the second circuit 52. The regulating circuit 16A receives an output from the first switching network 12A and provides its own output to an input of the second switching network 12B. An isolated controller 60 provides a first control signal to the first switching network 12A, a second control signal to the second switching network 12B, and a third control signal to the regulating circuit 16A.

Figure 66:
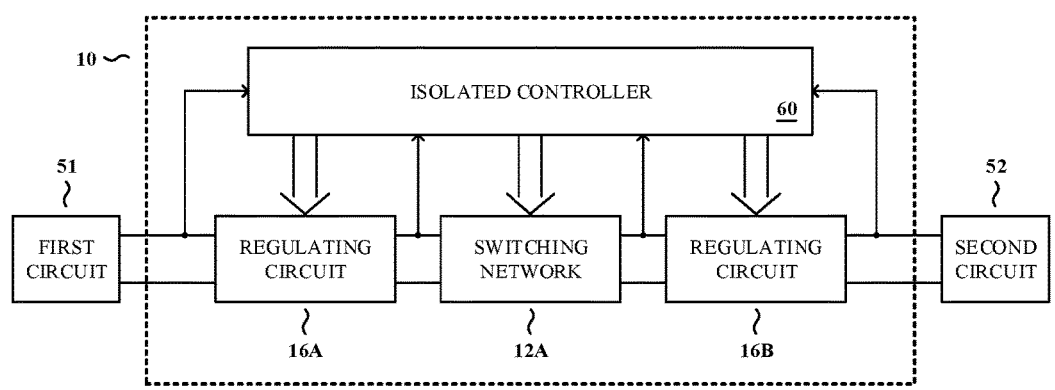
FIG. 66 shows a configuration of FIG. 26 with an isolated controller as shown in FIG. 64.
Figure 67:
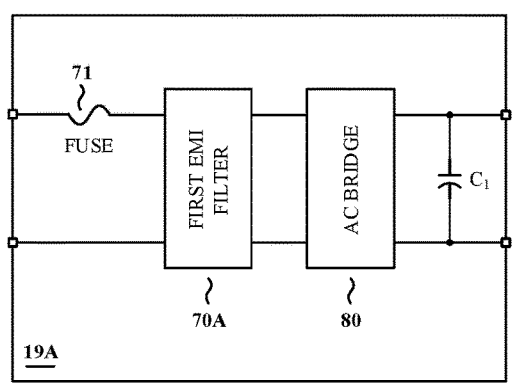
FIG. 67 shows an implementation of the rectifier shown in FIG. 55.
Figure 68:
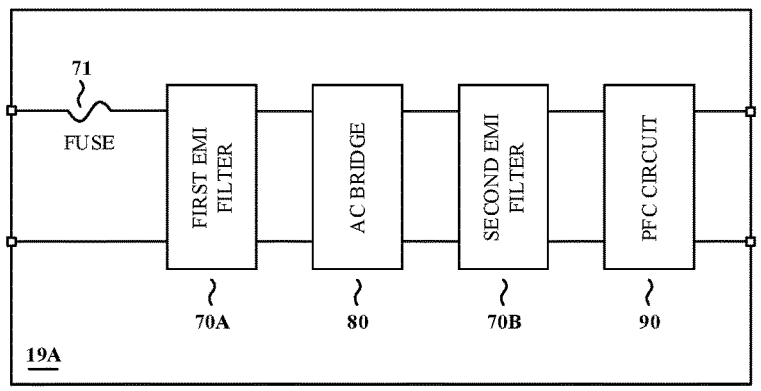
FIG. 68 shows an alternative implementation of the rectifier shown in FIG. 55.

Similarly, the embodiment shown in FIG. 26 can be modified to operate with an AC source 14B, as shown in FIG. 66, which shows first and second regulating circuits 16A, 16B and a switching network 12A. The first regulating circuit 16A receives, at its input, a voltage from the first circuit 51. The second regulating circuit 16B provides its output to the second circuit 52. The switching network 12A receives an output from the first regulating circuit 16A and provides its own output to an input of the second regulating circuit 126. An isolated controller 60 provides a first control signal to the first regulating circuit 16A, a second control signal to the regulating circuit 16B, and a third control signal to the switching network 12A. In some embodiments, as shown in FIG. 63, the second regulating circuit 16B can be implemented as an LC filter 21A. The AC rectification stage 19A shown in FIG. 55 can be implemented in a variety of ways. In one embodiment, shown in FIG. 67, the rectifier 19A features a fuse 71, a capacitor $C_1$, an AC bridge 80, and a first electromagnetic interference filter 70A between the AC bridge 80 and the AC source 14B. In another embodiment, shown in FIG. 68, a second EMI filter 70B and a power-factor correction circuit 90 replaces the capacitor $C_1$.

Figure 69:
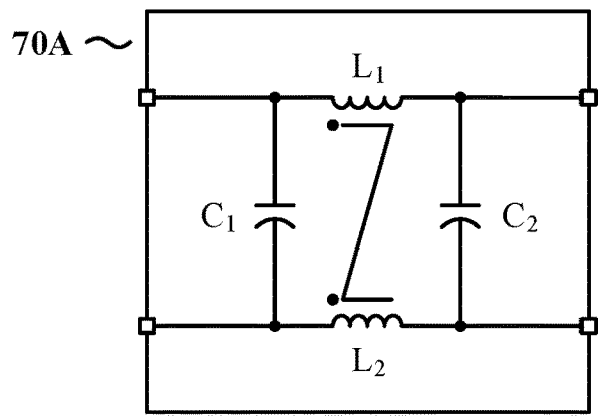
FIG. 69 shows an implementation of an EMI filter from the rectifiers shown in FIGS. 67 and 68.
Figure 70:
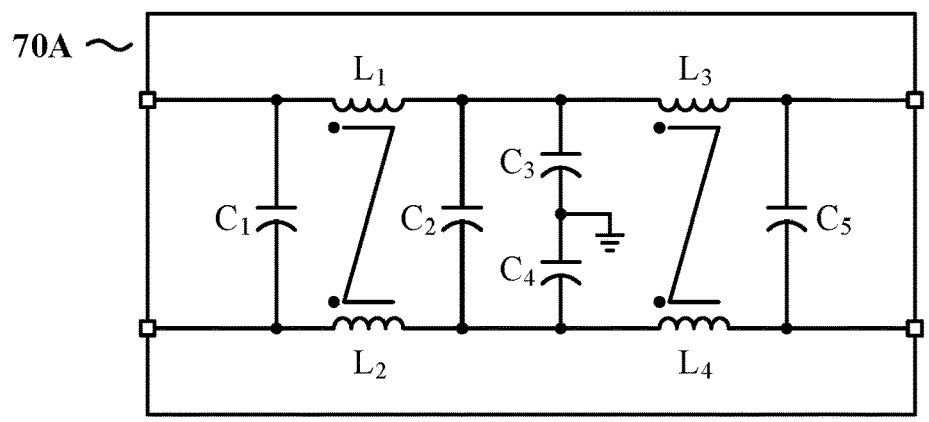
FIG. 70 shows an alternative implementation of an EMI filter from the rectifiers shown in FIGS. 67 and 68.

The first electromagnetic interference filter 70A, implementations of which can be seen in FIGS. 69 and 70, reduces the common-mode and differential-mode noise produced by the AC-DC converter 8 by a desired amount. The extent to which such noise is reduced is typically set by a government body, such as the FCC.

Figure 71:
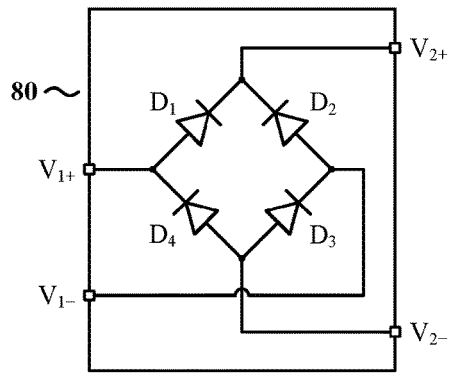
FIG. 71 shows an implementation of an AC bridge for use in the embodiments shown in FIGS. 67 and 68.

The AC bridge 80 accepts an AC voltage and outputs an average DC voltage. A particular implementation of an AC bridge 80 is shown in FIG. 71. The bridge includes first, second, third, and fourth diodes $D_1$, $D_2$, $D_3$, $D_4$. In operation, the AC bridge 80 transitions between first and second states. In the first state, the first and third diodes $D_1$, $D_3$ are reverse biased, and the second and fourth diodes are forward biased. In the second state, the second and fourth diodes $D_2$, $D_4$ are forward biased and the first and third diodes $D_1$, $D_3$ are reverse biased.

Figure 72:
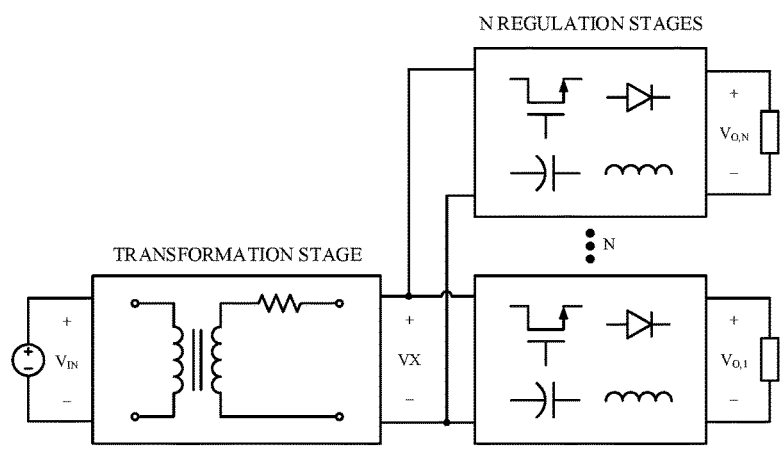
FIG. 72 shows one transformation stage driving two parallel regulation stages.

Many modern devices require different voltages to operate different components, such as power management integrated circuits (PMICs) in cell phones. For example, one voltage may be required to operate a processor, whereas another voltage may be needed to operate a display. In principle, one could have a separate transformation stage and regulation stage corresponding to each required output voltage. However, this solution is wasteful both of physical space and of pin count. A solution to this difficulty is that shown in FIG. 72, in which one transformation stage drives two or more regulation stages in parallel. Each regulation stage thus provides a separate output voltage. The regulator stage can be any of those already described, including a linear regulator.

To ensure adiabatic charging of the switched-capacitor network in the transformation stage, it is preferable that the majority of the power drawn by the various regulation stages come by way of a constant current. This can be achieved, for example, by synchronizing the regulation stages so that they draw as constant a current as possible, thus avoiding larger resistive losses in the switched-capacitor network of the transformation stage.

FIGS. 73-80 show specific implementations of modular power converters that conform to the architectural diagrams shown in FIGS. 22, 23, 24, and 26. In each implementation a regulating circuit or multiple regulating circuits may limit both the RMS charging current and the RMS discharging current of at least one capacitor in each switching network so all of these switching networks are adiabatically charged switching networks. However, if decoupling capacitors 9A or 9B are present, then the ability of the regulating circuit to limit the RMS charging and discharging current may be diminished. Capacitors 9A and 9B are optional and to keep the output voltage fairly constant capacitor $C_O$ is used. All of the stages share a common ground, however this need not be case. For example, if a regulating circuit is implemented as a fly-back converter than the ground can be separated easily, even a switching network can have separate grounds through capacitive isolation. Furthermore, for simplicity, the switching network in each implementation has a single conversion ratio. However, reconfigurable switching networks that provide power conversion at multiple distinct conversion ratios may be used instead.

In operation, switches labeled "1" and "2" are always in complementary states. Thus, in a first switched-state, all switches labeled "1" are open and all switches labeled "2" are closed. In a second switched-state, all switches labeled "1" are closed and all switches labeled "2" are opened. Similarly, switches labeled "3" are "4" are in complementary states, switches labeled "5" are "6" are in complementary states, and switches labeled "7" are "8" are in complementary states. Typically, the regulating circuits operate at higher switching frequencies than the switching networks.

However, there is no requirement on the switching frequencies between and amongst the switching networks and regulating circuits.

Figure 73:
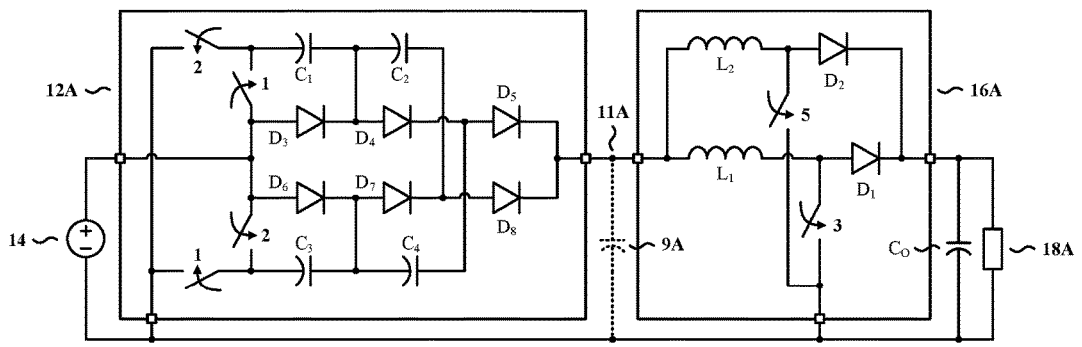
FIGS. 73 and 74 show particular implementations of the DC-DC converter illustrated in FIG. 22.

FIG. 73 shows a step-up converter corresponding to the architecture shown in FIG. 11. In this embodiment, the switching network 12A is a two-phase step-up cascade multiplier with a conversion ratio of 1:3 while the regulating circuit 16A is a two-phase boost converter. In operation, closing switches labeled 1 and opening switches 2 charges capacitors $C_3$ and $C_4$ while discharging capacitors $C_1$ and $C_2$. Conversely, opening switches 1 and closing switches 2 charges capacitors $C_1$ and $C_2$ while discharging capacitors $C_3$ and $C_4$.

Figure 74:
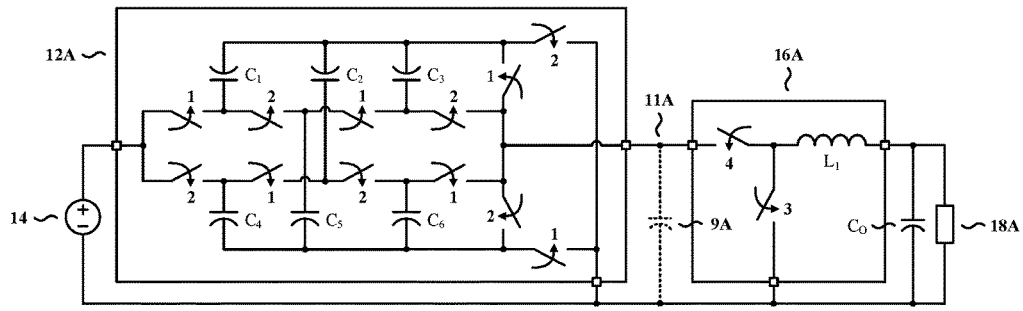

FIG. 74 shows bidirectional step-down converter corresponding to the architecture shown in FIG. 22. In this embodiment, the switching network 12A is a two-phase step-down cascade multiplier with a conversion ratio of 4:1 while the regulating circuit 16A is synchronous buck converter. In operation, closing switches 1 and opening switches 2 charges capacitors $C_1$, $C_2$, and $C_3$ while discharging capacitors $C_4$, $C_5$, and $C_6$. Conversely, opening switches 1 and closing switches 2 charges capacitors $C_4$, $C_5$, and $C_6$ while discharging capacitors $C_1$, $C_2$, and $C_3$. All of the active components are implemented with switches so that the converter can process power in both directions.

Figure 75:
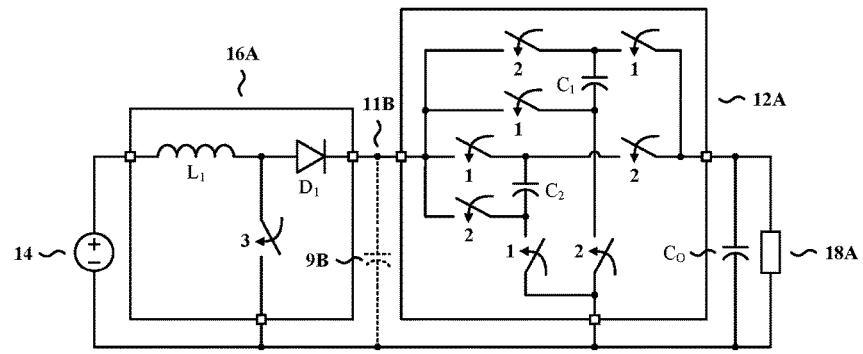
FIGS. 75 and 76 show particular implementations of the DC-DC converter illustrated in FIG. 24.

FIG. 75 shows a step-up converter consistent with the architecture shown in FIG. 24. In this embodiment, the regulating circuit 16A is boost converter while the switching network 12A is a two-phase step-up series-parallel switched-capacitor converter with a conversion ratio of 1:2. In operation, closing switches 1 charges capacitor $C_2$ while discharging capacitor $C_1$. Closing switches 2 has the complementary effect.

Figure 76:
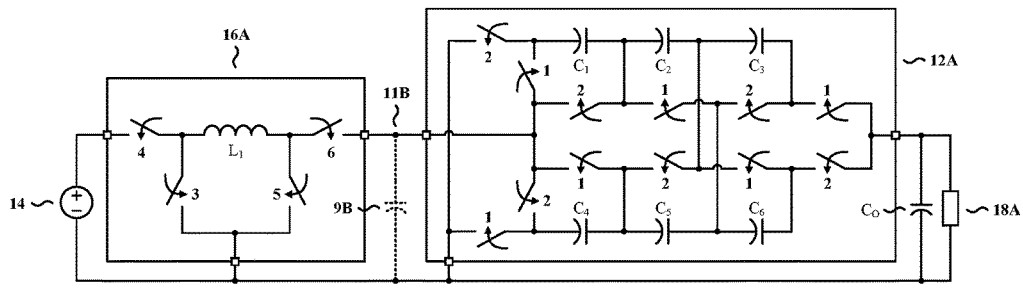

FIG. 76 shows a bidirectional up-down converter consistent with the architecture shown in FIG. 24. In this embodiment, the regulating circuit 16A is synchronous four switch buck-boost converter while the switching network 12A is a two-phase step-up cascade multiplier with a conversion ratio of 1:4. In operation, closing switches 1 charges capacitors $C_4$, $C_5$, and $C_6$ while discharging capacitors $C_1$, $C_2$, and $C_3$. Closing switches 2 has the complementary effect. All of the active components are implemented with switches so that the converter can process power in both directions.

Figure 2:
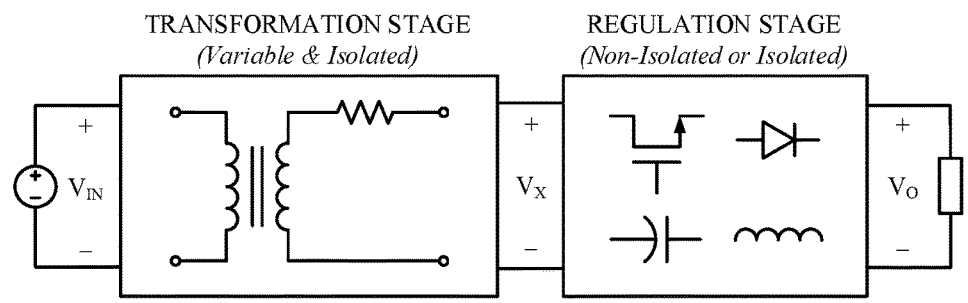
FIG. 2 shows a power converter similar to that shown in FIG. 1 but with an isolated transformation stage.
Figure 77:
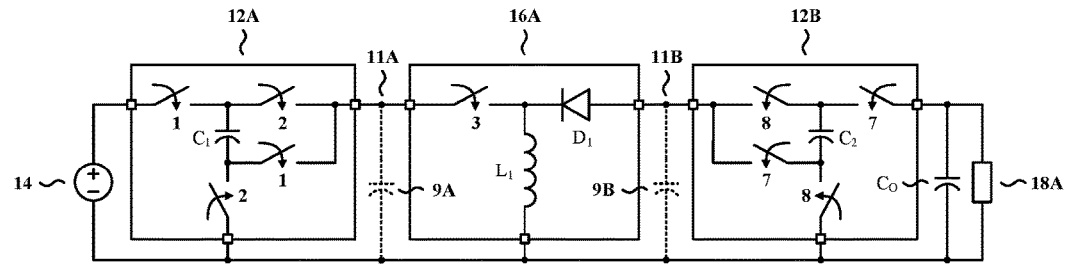
FIGS. 77 and 78 show particular implementations of the DC-DC converter illustrated in FIG. 23.

FIG. 77 shows an inverting up-down converter consistent with the architecture shown in FIG. 2. In this embodiment, the first switching network 12A is a step-down series-parallel switched-capacitor converter with a conversion ratio of 2:1, the first regulating circuit 16A is a buck/boost converter; and the second switching network 12B is a step-up series-parallel switched-capacitor converter with a conversion ratio of 1:2. In operation, closing switches 1 charges capacitor $C_1$ while closing switches 2 discharges capacitor $C_1$. Similarly, closing switches 7 discharges capacitor $C_2$ while closing switches 8 charges capacitor $C_2$.

Figure 78:
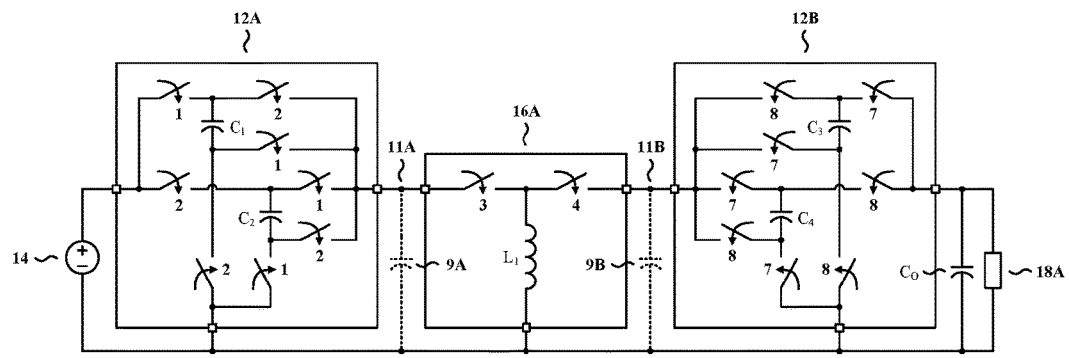

FIG. 78 shows a bidirectional inverting up-down converter consistent with the architecture shown in FIG. 23. In this embodiment, the first switching network 12A is a two-phase step-down series-parallel switched-capacitor converter with a conversion ratio of 2:1, the regulating circuit 16A is a synchronous buck/boost converter and the second switching network 12B is a two-phase step-up series-parallel switched-capacitor converter with a conversion ratio of 1:2. In operation, closing switches 1 charges capacitor $C_1$ while discharging capacitor $C_2$. Closing switches 2 has the complementary effect. Similarly, closing switches 7 charges capacitor $C_4$ while discharging capacitor $C_3$. Closing switches 2 has the complementary effect. All of the active components are implemented with switches so that the converter can process power in both directions.

Figure 79:
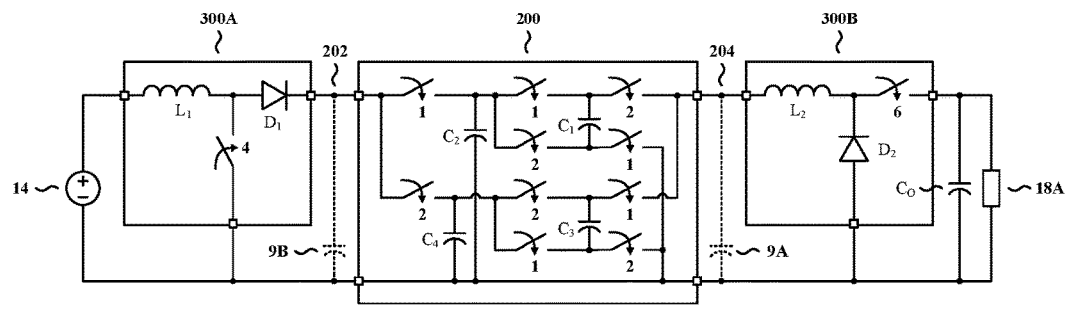
FIGS. 79 and 80 show particular implementations of the DC-DC converter illustrated in FIG. 26.

FIG. 79 shows a step-down converter consistent with the block diagram shown in FIG. 26. In this embodiment, the first regulating circuit 300A is a boost converter, the switching network 200 is a two-phase step-up series-parallel switched-capacitor converter with a conversion ratio of 1:2, and the second regulating circuit 300B is a boost converter. In operation, closing switches 1 charges capacitors $C_1$ and $C_2$ while simultaneously discharging capacitors $C_3$ and $C_4$. Closing switches 2 has the complementary effect.

Figure 80:
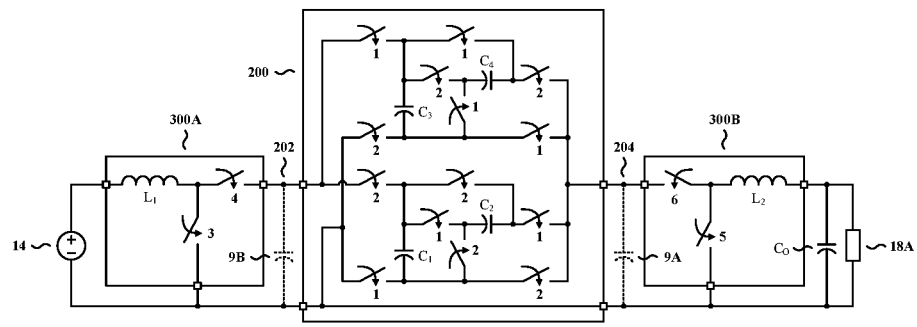

FIG. 80 shows a bidirectional up-down converter consistent with the block diagram shown in FIG. 26. In this embodiment, the first regulating circuit 300A is a synchronous boost converter, the switching network 200 is a two-phase fractional step-down series-parallel switched-capacitor converter with a conversion ratio of 3:2 and the second regulating circuit 300B is a synchronous buck converter. In operation, closing switches 1 charges capacitors $C_3$ and $C_4$ while simultaneously discharging capacitors $C_1$ and $C_2$. Closing switches 2 has the complementary effect. All of the active components are implemented with switches so that the converter can process power in both directions.

It should be understood that the topology of the regulating circuit can be any type of power converter with the ability to regulate the output voltage, including, but without limitation, synchronous buck, three-level synchronous buck, SEPIC, soft switched or resonant converters. Similarly, the switching networks can be realized with a variety of switched-capacitor topologies, depending on desired voltage transformation and permitted switch voltage.

The physical implementation of the foregoing switching networks 12A includes four primary components: passive device layers, active device layers, interconnect structures, and thru-vias. The passive device layers have passive devices, such as capacitors. The active device layers have active devices, such as switches.

The separation of active and passive devices in different layers arises because active devices are made by CMOS processing. Thus, if one has passive devices on the same layer, they must be made by CMOS-compatible processing steps to avoid destroying the active devices. This constraint makes it difficult to manufacture capacitors that provide high capacitance in a small area of the chip. It also makes it difficult to make high Q inductors. To avoid these difficulties, it is preferable to produce integrated passive devices on their own wafer with a process flow that is optimized for producing such passive devices.

In some embodiments, the devices are integrated into a single monolithic substrate. In other embodiments, the devices are integrated into multiple monolithic substrates. The monolithic substrates are typically made of semiconductor material, such as silicon.

In a preferred practice, one makes passive devices on a passive device layer using an integrated passive device process and makes active devices on an active device layer using a CMOS process. These device layers are electrically connected together through a fine interconnect structure that includes thru-vias to allow electrical connections across device layers.

Figure 81:
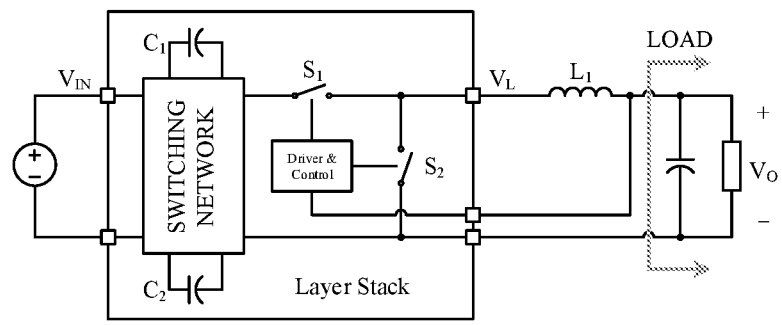
FIG. 81 shows a switching network implemented as a stack of layers.

FIG. 81 shows a circuit block diagram of a modular converter that uses capacitors in a switched-capacitor circuit to transfer energy. The block diagram shows a stack of layers that includes layers for both switches and capacitors. The switches within the stack of layers include first and second switches $S_1$, $S_2$. The capacitors within the stack of layers includes first and second capacitors $C_1$, $C_2$. A discrete inductor $L_1$ is mounted outside the layer stack.

Figure 82:
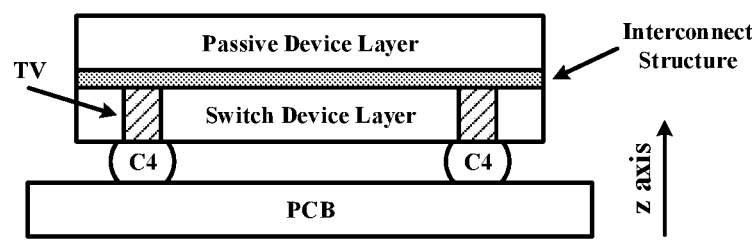
FIGS. 82-85 are cross-sections of the stack in FIG. 81 with different orders of passive and active layers.
Figure 83:
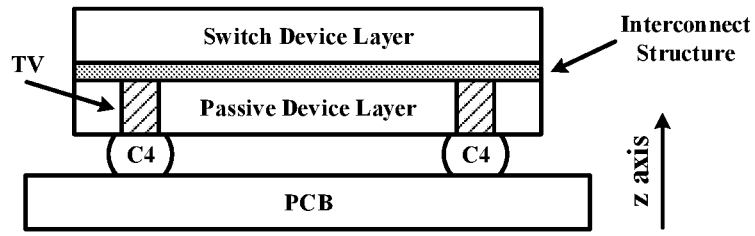
Figure 84:
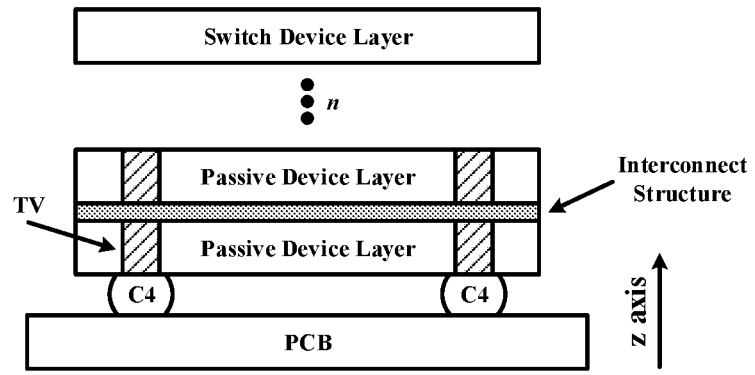

The layers within the stack of layers in FIG. 81 can be stacked in different ways. FIGS. 82-84 show side views of different ways of stacking layers, and placement of the interconnect structure and vias corresponding to each such configuration of layers. The active device layers include switches while the passive device layers include capacitors.

In FIG. 82, an active device layer connects to a printed-circuit board via a set of C4 bumps and a passive device layer is stacked above the active device layer. Thru-vias TV provide a connection between the printed-circuit board and an interconnect structure between the two layers.

In FIG. 83, this orientation is reversed, with the passive layer being connected to the printed-circuit board by the C4 bumps and the active layer above the passive layer. Once again, thru-vias TV provide a connection between the printed-circuit board and an interconnect structure between the two layers.

FIG. 84 shows the possibility of stacking multiple passive or active layers. In the particular embodiment shown, there are n passive devices layers and one active device layer. Through vias TV provide a path for connecting the printed-circuit board to interconnect structures between adjacent layers.

Figure 85:
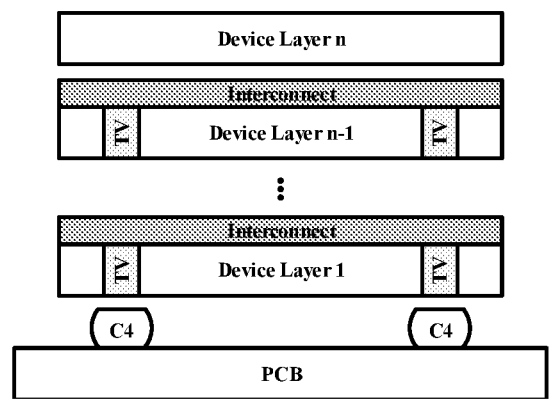

FIG. 85 shows an embodiment that has at least two device layers, one of which has switches and another of which has capacitors.

The C4 bumps are laid out along the printed-circuit board at a first pitch. An interconnect structure includes C5 bumps laid out at a second pitch that is smaller than the first pitch. An example of such C5 bumps can be seen in FIG. 95.

Each passive layer has capacitors that occupy a certain footprint on the chip. The capacitors are located such that each one is within a footprint of a switch on an active layer that is above or below the passive layer. Such an arrangement helps reduce energy loss and other parasitic losses in the interconnect structures.

Additional permutations arise because, as a result of the nature of known semiconductor fabrication processes, it is common to process only one face of a wafer. This face of the wafer has devices integrated into it. For this reason, it is called the "device face."

For each stack configuration, there are now additional permutations concerning whether the device face is an upper face or a lower face. For a given layer, with reference to the z-axis shown in FIGS. 82-84, an "upper face" of that layer faces in the +z direction a "lower face" faces in the –z direction.

As used herein, a layer is said to "face" the +z direction if a vector that is perpendicular to a plane defined by that layer and that is directed in a direction away from that layer is directed in the +z direction. A layer is said to face in the –z direction if it does not face the +z direction.

Figure 86:
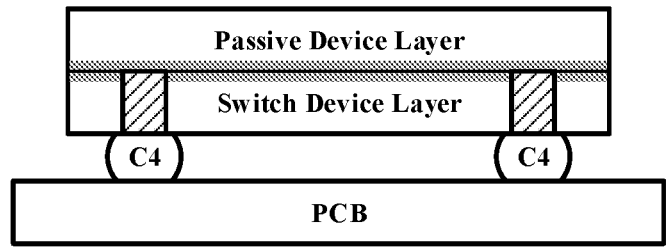
FIGS. 86-89 show different locations of active and passive device faces for the two-layer stack shown in FIG. 82.
Figure 87:
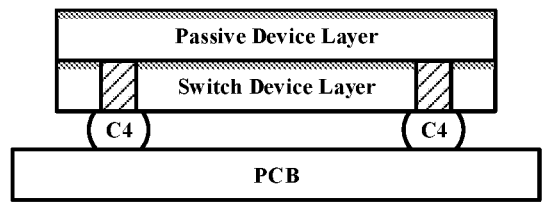
Figure 88:
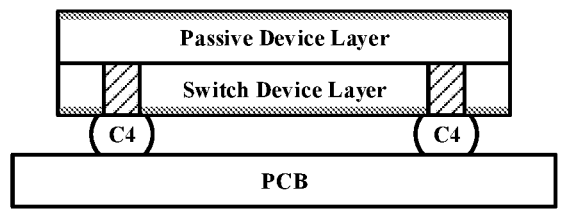

For the case in which there are only two device layers, FIGS. 86-88 show the four possible configurations of device faces when the upper layer is the passive layer, as shown in FIG. 82. FIGS. 90-93 show the four possible configurations of device faces when the upper layer is the active layer, as shown in FIG. 83.

Figure 89:
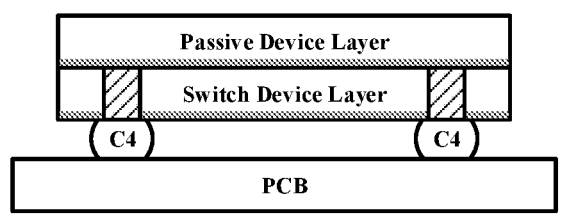

In FIG. 86, the active layer's device face is its upper face and the passive layer's device face is its lower face. Given that there are only two layers, this means they face each other. FIG. 88 shows a converse case in which the passive layer's device face is its upper face and the active layer's device face is its lower face. In FIG. 87, both the device faces of both the active and passive layers are on upper faces, whereas in FIG. 89 both are on lower faces.

Figure 90:
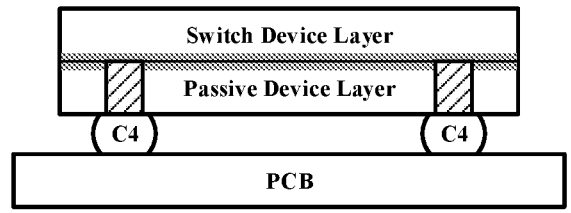
FIGS. 90-93 show different locations of active and passive device faces for the two-layer stack shown in FIG. 83.
Figure 91:
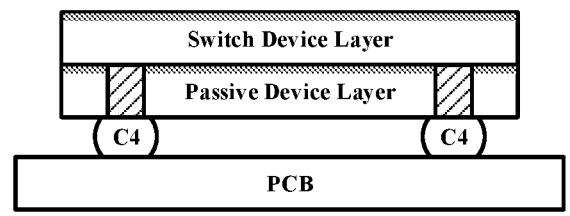
Figure 92:
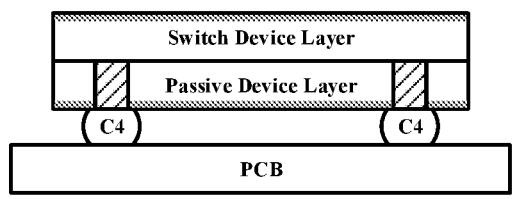
Figure 93:
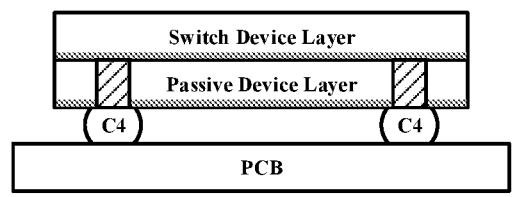

FIGS. 90-93 show the converse of FIGS. 86-89 for the case in which the active layer is now the upper layer. In FIG. 90, the active devices are on a lower face and the passive devices are on an upper face. Since there are only two layers, the active and passive devices face each other as they did in FIG. 86. In FIG. 91, the active devices and passive devices are on upper faces of their respective layers, whereas in FIG. 93 they are on lower faces of their respective layers. In FIG. 92, the active devices are on an upper face and the passive devices are on a lower face.

Naturally, certain configurations are preferable to others. The choice will depend upon numerous factors, most of which relate to thru-via technology and the number of pins that are available to connect the layers to external circuitry.

The passive device layer and active device layer can be in any form when attached. Two common choices would be in die or wafer form.

Figure 94:
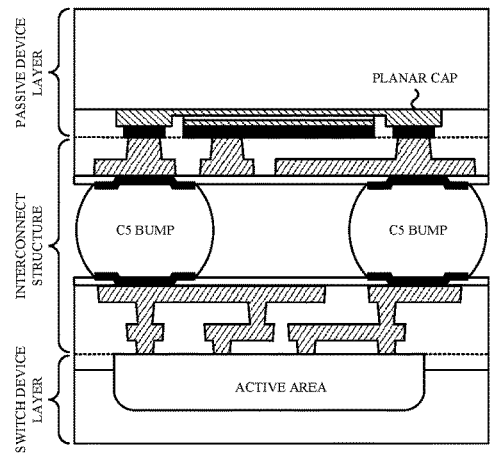
FIG. 94 shows an implementation of FIG. 82 in which the passive device layer has a planar capacitor.
Figure 95:
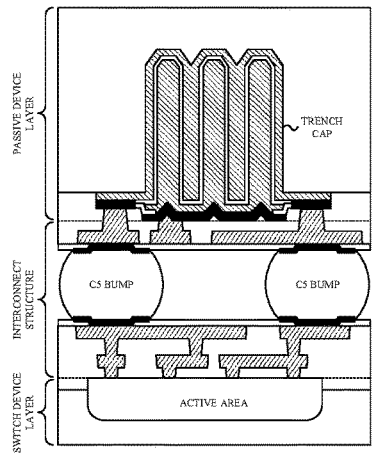
FIG. 95 shows an implementation of FIG. 82 in which the passive device layer has a trench capacitor.

FIGS. 94-95 show cross-sections of two die-to-die arrangements in which an interconnect structure connects switches in an active die to capacitors on a passive die. In FIG. 94, the switches connect to a planar capacitor whereas in FIG. 95 the switches connect to a trench capacitor. The first bumps C4, which provide the electrical connections from the die stack to the printed-circuit board, and through-vias TV are omitted in FIGS. 94-95 but can be seen in FIGS. 96-97.

Although any kind of capacitor can be used, trench capacitors are preferable to planar capacitors because trench capacitors offer greater capacitance per unit of die area than planar capacitors, sometimes by one or two orders of magnitude. Additionally, trench capacitors offer lower equivalent series resistance than planar capacitors. Both of these capacitor attributes are desirable for use in power converters that use capacitive energy transfer because they affect the efficiency of the power converter.

As shown in FIGS. 94-95, an interconnect structure connects the switches on the active die to the capacitors on the passive die. This interconnect structure can be implemented in numerous ways. In the case of FIGS. 94-95, the interconnect structure is the union of a multilayer interconnect structure on the passive die, a single layer of second bumps C5, and a multilayer interconnect structure on the active die. The only requirements are that the interconnect structure connects the switches on one device layer to the capacitors on the other device layer, that the two device layers are stacked one on top of the other, and that the second bumps C5 have a much finer pitch than the first bumps C4. In some embodiments, the pitch of the second bumps C5 is four times greater than the pitch of the first bumps. As used herein, "pitch" means the number of bumps per unit length.

Figure 96:
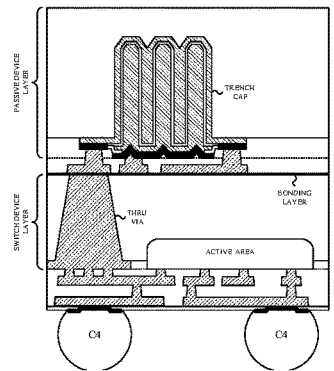
FIG. 96 shows an implementation of FIG. 94 with wafer-to-wafer bonding instead of die-to-die bonding.
Figure 97:
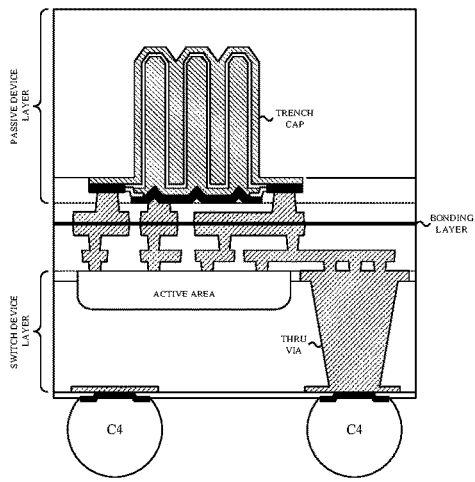
FIG. 97 shows an implementation of FIG. 96 but with the device face of the active layer being its upper face instead of its lower face.

FIGS. 96-97 show another embodiment implemented by wafer-to-wafer stacking. In this embodiment, there is no need for the second bumps C5. Instead, the active and passive wafers electrically connect to each other using a bonding process. In FIG. 96, the device face of the active layer is its lower face and in FIG. 97, the device face of the active layer is its upper face. Examples of suitable bonding processes are copper-copper and oxide-oxide bonding. Furthermore, FIGS. 96-97 show the thru-vias and some of the first bumps C4, which were omitted in FIGS. 94-95.

A switched-capacitor power converter of the type discussed herein has a great many switches and capacitors in a switched-capacitor power converter. These all have to be interconnected correctly for the power converter to operate. There are many ways to physically lay out the conducting paths that interconnect these components. However, not all of these ways are equally efficient. Depending on their geometry, some of these conducting paths may introduce noticeable parasitic resistance and/or inductance. Because there are so many interconnections, it can be a daunting challenge to choose a set of interconnections that will both provide acceptable parasitic resistance and inductance for the power converter as a whole.

One method that can be used to control these parasitic quantities is to partition the switches and capacitors.

Figure 99:
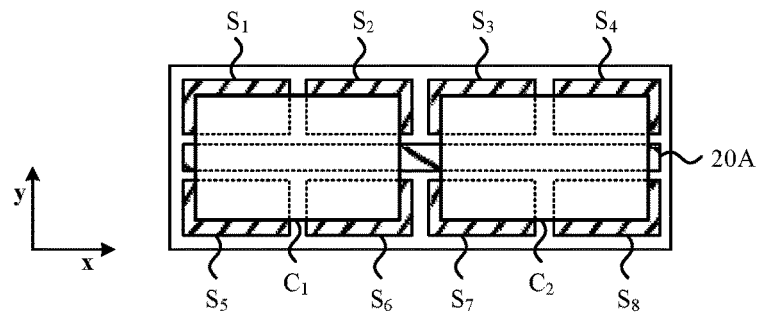
FIG. 99 shows an active layer with eight switches superimposed on eight capacitors on a passive layer below it.

One way to reduce such parasitic quantities is to choose the shape and locations of the switches on the active layer so that they fit beneath the capacitors on the passive layer. This avoids forcing current to undertake a long journey along the faces of the layers as it travels between a switch and a capacitor. An example of this technique is shown in FIG. 99, in which eight switches $S_1$-$S_8$ and a controller 20A are disposed on an active layer that is located below a passive layer having two capacitors. Although the switches are not completely visible through the passive layer, their locations are marked by dotted lines on FIG. 99. The figure shows a first capacitor $C_1$ on top of switches $S_1$, $S_2$, $S_5$, $S_6$ and a second capacitor $C_2$ on top of switches $S_3$, $S_4$, $S_7$, $S_8$.

Another way to reduce such parasitic quantities arises from recognizing that switches in a switching network 12A are usually active devices that are implemented with transistors. The switching network 12A may be integrated on a single monolithic semiconductor substrate or on multiple monolithic semiconductor substrates, or formed using discrete devices. Furthermore, since the device is a power converter, each switch may be expected to carry a large amount of current. A switch that carries a great deal of current is often implemented by numerous current paths connected in parallel to a common terminal.

Figure 98:
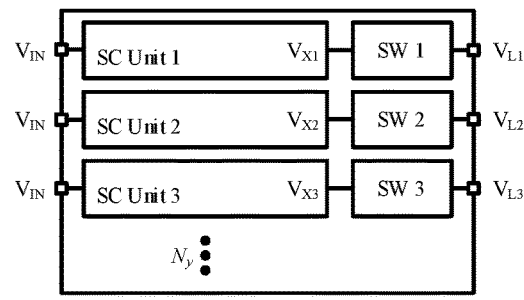
FIG. 98 shows three partitioned current paths of a switching network.
Figure 101:
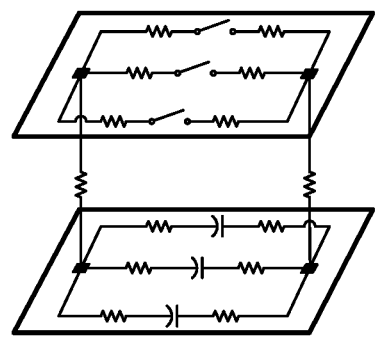
FIG. 101 shows a divided switching but not partitioned switch and capacitor.

In a switch as described above, the current paths that make up the switch are physically located side-by-side and thus occupy a space having a non-zero width. These current paths all connect to a terminal that is itself connected to a conducting path. An example of this configuration is shown in FIG. 98 and FIG. 101. In particular, FIG. 101 shows a transistor on a first layer and a capacitor on a lower layer. The transistor has first, second, and third current paths with the second current path being between the first and third. The three current paths extend between one source terminal and one drain terminal of the transistor.

Some current entering the source terminal shown in FIG. 101 goes straight ahead into the second current path. But some of it turns left or right before turning again to proceed down the first and third current paths. At the other end of the transistor's channel, current that traversed the first and third current paths must again make a turn to reach the drain terminal. These currents are referred to as "lateral" current.

Similarly, the lower layer of FIG. 101 shows a capacitor that has three separate current paths connected to first and second capacitor terminals. In the course of being charged and discharged, some lateral current is inevitable for reasons discussed in connection with the transistor in the upper layer.

Figure 102:
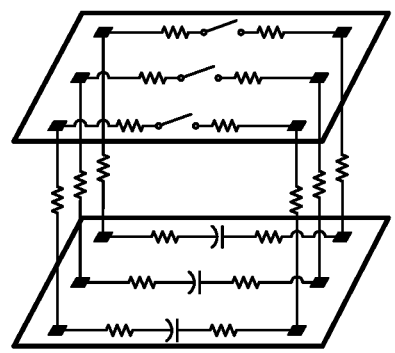
FIG. 102 shows a partitioned switch and capacitor.

One way to reduce this lateral current is to partition the switches and the capacitors into numerous partitions, as shown in FIG. 98 and FIG. 102. This partitioning essentially involves converting an n-terminal device into an (n+m) terminal device where m depends on the number of partitions. Thus, after having been partitioned, the two-terminal capacitor of FIG. 101 is transformed into a six-terminal capacitor in FIG. 102. Similarly, the source terminal and drain terminal of the transistor in FIG. 101 is transformed into three source terminals and three drain terminals in the transistor of FIG. 102.

The difference between FIGS. 101 and 102 is that each current path in FIG. 102 has its own terminal. In contrast, in FIG. 101, all current paths share the same terminals. Thus, FIG. 101 shows three current paths connected in parallel, whereas FIG. 102 shows three current paths that are partitioned and therefore isolated from each other.

The three current paths shown collectively represent a switch on an active layer that is formed by various doping profiles along a piece of silicon to provide charge carriers and then connecting those three lines to a pair of external terminals, as shown in FIG. 101, or connecting each line to its own pair of external terminals, as shown in FIG. 102.

The capacitor represented by the lower layer of FIG. 101 is a two-terminal capacitor like any conventional capacitor. Prior art converters use capacitors of this type. However, unlike prior art converters, which use two-terminal capacitors, a converter as disclosed herein uses a six-terminal capacitor as shown FIG. 102. Although such a capacitor is more complex because it has more terminals that need to be both made and properly aligned, it reduces parasitic effects caused by lateral current.

Similarly, the transistor switch represented by the upper layer of FIG. 101 has one source terminal and one drain terminal. This is the kind of transistor that is used in conventional power converters. In contrast, the transistor represented by the upper layer of FIG. 102 has three source terminals and three drain terminals. Although such a transistor is more complex because it has more terminals that need to be both made and properly aligned, it reduces parasitic effects caused by lateral current.

Figure 100:
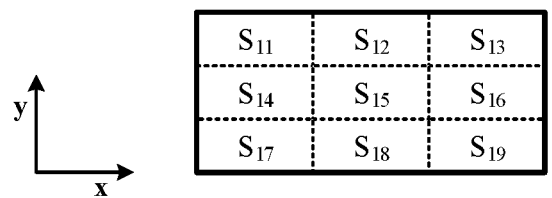
FIG. 100 shows one of the switches in FIG. 99 that has been partitioned into nine partitions.

It should be apparent that the act of partitioning is geometry-independent. Its essence is that of turning an n-terminal device into an (n+m) terminal device in an effort to reduce parasitic effects. There is no requirement that the device be oriented in any particular way. In particular, there is no requirement that the partitioning be carried out in only one dimension as shown in FIG. 102. For example, it is quite possible to partition a component along x and y directions as shown in the nine-partition switch of FIG. 100 and the six-partition capacitor shown in FIG. 103.

Figure 103:
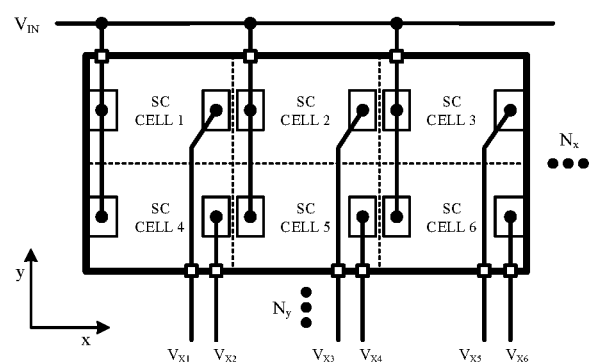
FIG. 103 shows a capacitor partitioned in two dimensions.

Both the techniques shown in FIG. 102 and FIG. 103 reduce the vertical and lateral distance between the active and passive devices while also providing a uniform current distribution to each individual switch and/or switched-capacitor cell. This tends to reduce the parasitic resistance and inductance of the connection between the switches and capacitors. This offers considerable advantages. Parasitic inductance limits the switching speed while parasitic resistance limits the efficiency of the power conversion process.

Among other advantages, the arrangements described above avoid the component and pin count penalty, reduce the energy loss in the parasitic interconnect structures, and reduces the total footprint of power converters that use capacitors to transfer energy.

Figure 104:
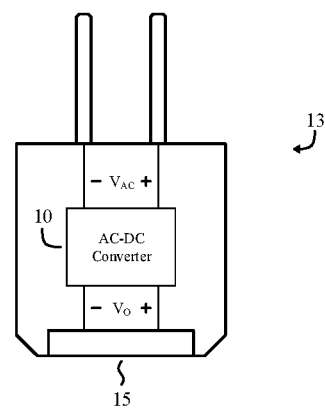
FIG. 104 shows a travel adapter having a power converter.

Switching networks along the lines of the foregoing can be used to control a power converter in a travel adapter 13, as shown in FIG. 104. Such a travel adapter 13 outputs a DC voltage at a USB port 15 thereof.

In some implementations, a computer accessible storage medium includes a database representative of one or more components of the converter. For example, the database may include data representative of a switching network that has been optimized to promote low-loss operation of a charge pump.

Generally speaking, a computer accessible storage medium may include any non-transitory storage media accessible by a computer during use to provide instructions and/or data to the computer. For example, a computer accessible storage medium may include storage media such as magnetic or optical disks and semiconductor memories.

Generally, a database representative of the system may be a database or other data structure that can be read by a program and used, directly or indirectly, to fabricate the hardware comprising the system. For example, the database may be a behavioral-level description or register-transfer level (RTL) description of the hardware functionality in a high level design language (HDL) such as Verilog or VHDL. The description may be read by a synthesis tool that may synthesize the description to produce a netlist comprising a list of gates from a synthesis library. The netlist comprises a set of gates that also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. In other examples, Alternatively, the database may itself be the netlist (with or without the synthesis library) or the data set.

Having described one or more preferred embodiments, it will be apparent to those of ordinary skill in the art that other embodiments incorporating these circuits, techniques and concepts may be used. Accordingly, it is submitted that the scope of the patent should not be limited to the described embodiments, but rather, should be limited only by the spirit and scope of the appended claims.

The invention claimed is:

1. An apparatus for controlling a power converter that transforms a first voltage into a second voltage, said power converter comprising an inductance and a capacitor network, said apparatus including a switched-capacitor terminal for connection to said capacitor network, and first and second switch sets, each comprising a plurality of switches, at least one of said switches being connected to said switched-capacitor terminal, said switch sets, when connected to said capacitor network, defining a switched-capacitor network comprising capacitors interconnected by switches, wherein closing switches in said first switch set and opening switches in said second switch set arranges capacitors of said switched-capacitor network into a first state and closing said switches in said second set and opening said switches in said first set arranges said capacitors in a second state, said apparatus further comprising a controller that, when in operation, causes said switched-capacitor network to transition between said first state and the second state at a specific frequency, thereby transferring charge between capacitors and terminals of said switched-capacitor network and causes said inductance to cooperate with said switched-capacitor network to cause transformation of said first voltage into said second voltage, wherein said controller comprises a first control circuit and a second control circuit, said first and second control circuits being isolated from each other.

2. The apparatus of claim 1, wherein said power converter comprises a diode circuit comprising first, second, third, and fourth diodes, wherein a cathode of said third diode and an anode of said second diode meet at a first node, wherein cathodes of said first and second diodes meet at a second node, wherein an anode of said first diode and a cathode of said fourth diode meet at a third node, wherein anodes of said third and fourth diodes meet at a fourth node, and wherein said first and third nodes are connected to an AC source.

3. The apparatus of claim 2, further comprising a filter circuit, wherein said filter circuit is configured to reduce available power from said AC source by suppressing transmission of energy in high frequency harmonics provided by said AC source.

4. The apparatus of claim 2, wherein said power converter further comprises circuitry configured to suppress radiation of electromagnetic waves having a fundamental frequency equal to said specific frequency.

5. The apparatus of claim 1, wherein said first and second control circuits are magnetically isolated from each other.

6. The apparatus of claim 1, wherein said first and second control circuits are electrically isolated from each other.

7. The apparatus of claim 1, wherein said first and second control circuits are inductively isolated from each other.

8. The apparatus of claim 1, wherein said first and second control circuits are capacitively isolated from each other.

9. The apparatus of claim 1, wherein said first and second control circuits communicate with each other optically.

10. The apparatus of claim 1, further comprising an integrated circuit, wherein said first and second control circuits are part of said integrated circuit.

11. The apparatus of claim 1, further comprising first and second integrated circuits, wherein said first control circuit is on said first integrated circuit, and wherein said second control circuit is on said second integrated circuit.

12. The apparatus of claim 1, wherein said first control circuit outputs a first control signal, wherein said second control circuit outputs a second control signal, wherein said first control signal is a voltage difference between a first voltage and a second voltage that is lower than said first voltage, wherein said second control signal is a voltage difference between a third voltage and a fourth voltage that is lower than said third voltage, and wherein said fourth voltage and said second voltage are different.

13. The apparatus of claim 1, wherein said inductance is configured to be connected to said switched-capacitor network for constraining inter-capacitor charge transfer within said switched-capacitor network.

14. The apparatus of claim 1, wherein said controller comprises a first control circuit and a second control circuit, wherein said first and second control circuits connect to different sides of a transformer.

15. The apparatus of claim 1, wherein said first and second control circuits output corresponding first and second control signals that lack a common ground.

16. The apparatus of claim 1, wherein said first and second control circuits are in galvanic isolation from each other.

17. The apparatus of claim 1, wherein said switches and said controller are incorporated into a travel adapter.

18. The apparatus of claim 1, wherein said terminals of said switched-capacitor network comprise a first terminal maintained at a first voltage difference, said first voltage difference being a difference between a first voltage and a second voltage and a second terminal maintained at a second voltage difference, said second voltage difference being a difference between a third voltage and a fourth voltage, and wherein, during the course of operating said switched-capacitor network, said fourth voltage is constrained to be equal to said second voltage.

19. The apparatus of claim 1, wherein said terminals of said switched-capacitor network comprise a first terminal maintained at a first voltage difference, said first voltage difference being a difference between a first voltage and a second voltage and a second terminal maintained at a second voltage difference, said second voltage difference being a difference between a third voltage and a fourth voltage, wherein, during the course of operating said switched-capacitor network, said fourth voltage and said second voltage are free to differ, and wherein said first and second terminals are isolated from each other.

20. The apparatus of claim 1, wherein said controller is configured to reconfigure said switched capacitor network during operation thereof.

* * * * *